US012651380B2

(12) United States Patent (10) Patent No.: US 12,651,380 B2
Shin et al. (45) Date of Patent: Jun. 9, 2026

(54) METHOD FOR DECODING IMMERSIVE VIDEO AND METHOD FOR ENCODING IMMERSIVE VIDEO

(71) Applicant: Electronics and Telecommunications Research Institute, Daejeon (KR)

(72) Inventors: Hong Chang Shin, Daejeon (KR); Gwang Soon Lee, Daejeon (KR); Kwan Jung Oh, Daejeon (KR); Jun Young Jeong, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 441 days.

(21) Appl. No.: 18/323,834

(22) Filed: May 25, 2023

(65) Prior Publication Data

US 2023/0386090 A1 Nov. 30, 2023

(30) Foreign Application Priority Data

May 26, 2022 (KR) ........................ 10-2022-0064871

(51) Int. Cl.
*G06T 9/00* (2006.01)
*G06T 9/40* (2006.01)

(52) U.S. Cl.
CPC ................ *G06T 9/001* (2013.01); *G06T 9/40* (2013.01)

(58) Field of Classification Search
None
See application file for complete search history.

(56) References Cited

U.S. PATENT DOCUMENTS

| | | | |
|---|---|---|---|
| 11,212,505 B2 | 12/2021 | Lee et al. | |
| 11,350,074 B2 * | 5/2022 | Shin | H04N 13/156 |
| 11,394,946 B2 * | 7/2022 | Oh | H04N 13/178 |
| 11,509,879 B2 * | 11/2022 | Oh | H04N 19/597 |
| 11,558,597 B2 * | 1/2023 | Oh | H04N 13/111 |
| 11,677,922 B2 * | 6/2023 | Oh | H04N 13/161 |
| | | | 348/43 |
| 11,726,184 B2 * | 8/2023 | Ferreira | G01S 17/894 |
| | | | 356/4.01 |

(Continued)

FOREIGN PATENT DOCUMENTS

| | | |
|---|---|---|
| JP | 2003-109005 | 4/2003 |
| KR | 10-1871222 | 6/2018 |
| KR | 10-2021-0036834 | 4/2021 |

OTHER PUBLICATIONS

Salahieh, B., Jung, J., Dziembowski, A. (Eds.). "Test Model 11 for MPEG Immersive Video". ISO/IEC JTC 1/SC 29/WG 04 MPEG Video Coding Convenorship: CN. Oct. 29, 2021. https://isotc.iso.org/livelink/livelink/open/jtc1sc29wg4.

*Primary Examiner* — Anand P Bhatnagar
(74) *Attorney, Agent, or Firm* — KILE PARK REED & HOUTTEMAN PLLC

(57) ABSTRACT

An image encoding method according to the present disclosure may include classifying a plurality of view images into a basic image and an additional image; performing pruning for at least one of the plurality of view images based on a result of the classification; generating an atlas based on a result of performing the pruning; and encoding the atlas and metadata for the atlas. In this case, the metadata may include spherical harmonic function information on a point in a three-dimensional space.

20 Claims, 17 Drawing Sheets

(56)     References Cited

U.S. PATENT DOCUMENTS

2021/0321072 A1*  10/2021  Oh ...................... H04N 13/194
2021/0329214 A1*  10/2021  Oh ...................... H04N 13/178
2021/0329216 A1*  10/2021  Oh ...................... H04N 13/156
2021/0385423 A1*  12/2021  Oh ...................... H04N 19/597
2021/0409670 A1*  12/2021  Oh ................... H04N 21/23614

* cited by examiner

FIG. 6

Disoccluded area

605
View R1

604
View C1

603
View V

602
View L1

METHOD FOR DECODING IMMERSIVE VIDEO AND METHOD FOR ENCODING IMMERSIVE VIDEO

This application claims the benefit of Korean Patent Application No. 10-2022-0064871, filed May 26, 2022, which are hereby incorporated by reference in their entireties into this application.

TECHNICAL FIELD

The present disclosure relates to a method for encoding/decoding an immersive video which supports motion parallax for a rotation and translation motion.

DESCRIPTION OF THE RELATED ART

A virtual reality service is evolving in a direction of providing a service in which a sense of immersion and realism are maximized by generating an omnidirectional image in a form of an actual image or CG (Computer Graphics) and playing it on HMD, a smartphone, etc. Currently, it is known that 6 Degrees of Freedom (DoF) should be supported to play a natural and immersive omnidirectional image through HMD. For a 6DoF image, an image which is free in six directions including (1) left and right rotation, (2) top and bottom rotation, (3) left and right movement, (4) top and bottom movement, etc. should be provided through a HMD screen. But, most of the omnidirectional images based on an actual image support only rotary motion. Accordingly, a study on a field such as acquisition, reproduction technology, etc. of a 6DoF omnidirectional image is actively under way.

DISCLOSURE

Technical Problem

The present disclosure is to provide a method of encoding/decoding a spherical harmonic function.

The present disclosure is to provide a method of determining a position where a spherical harmonic function will be encoded/decoded.

The technical objects to be achieved by the present disclosure are not limited to the above-described technical objects, and other technical objects which are not described herein will be clearly understood by those skilled in the pertinent art from the following description.

Technical Solution

An image encoding method according to the present disclosure may include classifying a plurality of view images into a basic image and an additional image; performing pruning for at least one of the plurality of view images based on a result of the classification; generating an atlas based on a result of performing the pruning; and encoding the atlas and metadata for the atlas. In this case, the metadata may include spherical harmonic function information on a point in a three-dimensional space.

In an image encoding method according to an embodiment of the present disclosure, the spherical harmonic function information may include a coefficient of a spherical harmonic function and the coefficient may be determined based on a color value unprojected on the point from at least one of the plurality of view images.

In an image encoding method according to an embodiment of the present disclosure, information on the spherical harmonic function may be encoded as data on a patch in an atlas.

In an image encoding method according to an embodiment of the present disclosure, for the patch, a flag representing whether a point that a spherical harmonic function is allocated to the patch exists may be encoded, and for a case in which the point that the spherical harmonic function is allocated to the patch exists, information on the spherical harmonic function may be encoded.

In an image encoding method according to an embodiment of the present disclosure, information on the spherical harmonic function may be encoded only for the basic image among the plurality of view images.

In an image encoding method according to an embodiment of the present disclosure, for each of regions partitioned by a quadtree structure, information representing whether a point to which a spherical harmonic function is allocated exists may be encoded, and for a case in which the point to which a spherical harmonic function is allocated exists in the partitioned region, information on the spherical harmonic function for the point in the partitioned region may be encoded.

In an image encoding method according to an embodiment of the present disclosure, for each of points forming a grid structure in a three-dimensional space, the spherical harmonic function may be encoded.

In an image encoding method according to an embodiment of the present disclosure, only for a point positioned on a non-Lambertian surface among points forming a grid structure in a three-dimensional space, information on the spherical harmonic function may be encoded.

In an image encoding method according to an embodiment of the present disclosure, a plurality of closed points may be configured on an object surface searched based on a depth map for the basic image and the information on the spherical harmonic function may be encoded for each of the plurality of closed points.

In an image encoding method according to an embodiment of the present disclosure, a second layer separated by an offset from a first layer configured with the closed points may be configured and information on the spherical harmonic function may be additionally encoded for each of open points included in a second layer.

In an image encoding method according to an embodiment of the present disclosure, view dependence information of the additional view not overlapped with the basic image may be extracted as a patch and information of the spherical harmonic function may be encoded for a point included in the patch.

In an image encoding method according to an embodiment of the present disclosure, information of the spherical harmonic function may include at least one of a scale of the point, an initial reference coordinate of a spherical harmonic function, the number of coefficients of a spherical harmonic function or a value of each of coefficients.

An image decoding method according to the present disclosure may include decoding an atlas and metadata for the atlas; and generating a viewport image by using the atlas and the metadata. In this case, the metadata may include spherical harmonic function information on a reference point in a three-dimensional space.

In an image decoding method according to an embodiment of the present disclosure, a pixel value for a first point in the viewport image may be derived based on the spherical harmonic function for a plurality of reference points adjacent to the first point.

In an image decoding method according to an embodiment of the present disclosure, the plurality of reference points may configure a unit grid that the first point is included.

In an image decoding method according to an embodiment of the present disclosure, information on the spherical harmonic function may be included in data on a patch in the atlas.

In an image decoding method according to an embodiment of the present disclosure, for the patch, a flag representing whether a point that a spherical harmonic function is allocated to the patch exists may be decoded and when the flag indicates that the point that the spherical harmonic function is allocated to the patch exists, information on the spherical harmonic function may be decoded.

In an image decoding method according to an embodiment of the present disclosure, the metadata may include information on the spherical harmonic function for reference points belonging to a first layer and reference points belonging to a second layer, respectively.

In an image decoding method according to an embodiment of the present disclosure, the metadata may include offset information representing a position difference between the first layer and the second layer.

The technical objects to be achieved by the present disclosure are not limited to the above-described technical objects, and other technical objects which are not described herein will be clearly understood by those skilled in the pertinent art from the following description.

Technical Effects

According to the present disclosure, based on a spherical harmonic function, there is an effect of improving image quality by expressing a texture considering reflected light.

According to the present disclosure, there is an effect of reducing the amount of data to be encoded/decoded by selecting a position where information on a spherical harmonic function is encoded/decoded.

Effects achievable by the present disclosure are not limited to the above-described effects, and other effects which are not described herein may be clearly understood by those skilled in the pertinent art from the following description.

BRIEF DESCRIPTION OF DRAWINGS

FIG. 6 represents a plurality of images captured by using cameras with a different view.

FIG. 7 represents a method of removing redundant data between a plurality of view images.

DESCRIPTION OF THE PREFERRED EMBODIMENTS

Figure 1:
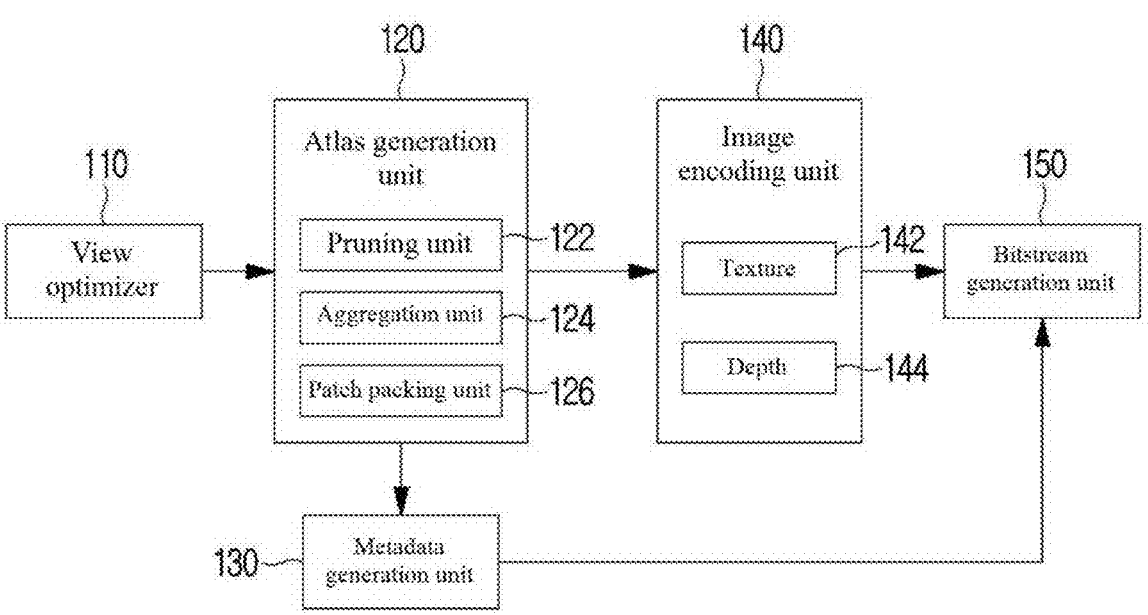
FIG. 1 is a block diagram of an immersive video processing device according to an embodiment of the present disclosure.

As the present disclosure may make various changes and have multiple embodiments, specific embodiments are illustrated in a drawing and are described in detail in a detailed description. But, it is not to limit the present disclosure to a specific embodiment, and should be understood as including all changes, equivalents and substitutes included in an idea and a technical scope of the present disclosure. A similar reference numeral in a drawing refers to a like or similar function across multiple aspects. A shape and a size, etc. of elements in a drawing may be exaggerated for a clearer description. A detailed description on exemplary embodiments described below refers to an accompanying drawing which shows a specific embodiment as an example. These embodiments are described in detail so that those skilled in the pertinent art can implement an embodiment. It should be understood that a variety of embodiments are different each other, but they do not need to be mutually exclusive. For example, a specific shape, structure and characteristic described herein may be implemented in other embodiment without departing from a scope and a spirit of the present disclosure in connection with an embodiment. In addition, it should be understood that a position or an arrangement of an individual element in each disclosed embodiment may be changed without departing from a scope and a spirit of an embodiment. Accordingly, a detailed description described below is not taken as a limited meaning and a scope of exemplary embodiments, if properly described, are limited only by an accompanying claim along with any scope equivalent to that claimed by those claims.

In the present disclosure, a term such as first, second, etc. may be used to describe a variety of elements, but the elements should not be limited by the terms. The terms are used only to distinguish one element from other element. For example, without getting out of a scope of a right of the present disclosure, a first element may be referred to as a second element and likewise, a second element may be also referred to as a first element. A term of and/or includes a combination of a plurality of relevant described items or any item of a plurality of relevant described items.

When an element in the present disclosure is referred to as being "connected" or "linked" to another element, it should be understood that it may be directly connected or linked to that another element, but there may be another element between them. Meanwhile, when an element is referred to as being "directly connected" or "directly linked" to another element, it should be understood that there is no another element between them.

As construction units shown in an embodiment of the present disclosure are independently shown to represent different characteristic functions, it does not mean that each construction unit is composed in a construction unit of separate hardware or one software. In other words, as each construction unit is included by being enumerated as each construction unit for convenience of a description, at least two construction units of each construction unit may be combined to form one construction unit or one construction unit may be divided into a plurality of construction units to perform a function, and an integrated embodiment and a separate embodiment of each construction unit are also included in a scope of a right of the present disclosure unless they are beyond the essence of the present disclosure.

A term used in the present disclosure is just used to describe a specific embodiment, and is not intended to limit the present disclosure. A singular expression, unless the context clearly indicates otherwise, includes a plural expression. In the present disclosure, it should be understood that a term such as "include" or "have", etc. is just intended to designate the presence of a feature, a number, a step, an operation, an element, a part or a combination thereof described in the present specification, and it does not exclude in advance a possibility of presence or addition of one or more other features, numbers, steps, operations, elements, parts or their combinations. In other words, a description of "including" a specific configuration in the present disclosure does not exclude a configuration other than a corresponding configuration, and it means that an additional configuration may be included in a scope of a technical idea of the present disclosure or an embodiment of the present disclosure.

Some elements of the present disclosure are not a necessary element which performs an essential function in the present disclosure and may be an optional element for just improving performance. The present disclosure may be implemented by including only a construction unit which is necessary to implement essence of the present disclosure except for an element used just for performance improvement, and a structure including only a necessary element except for an optional element used just for performance improvement is also included in a scope of a right of the present disclosure.

Hereinafter, an embodiment of the present disclosure is described in detail by referring to a drawing. In describing an embodiment of the present specification, when it is determined that a detailed description on a relevant disclosed configuration or function may obscure a gist of the present specification, such a detailed description is omitted, and the same reference numeral is used for the same element in a drawing and an overlapping description on the same element is omitted.

An immersive video, when a user's viewing position is changed, refers to a video that a viewport image may be also dynamically changed. In order to implement an immersive video, a plurality of input images are required. Each of a plurality of input images may be referred to as a source image or a view image. A different view index may be assigned to each view image.

An immersive video may be classified into 3DoF (Degree of Freedom), 3DoF+, Windowed-6DoF or 6DoF type, etc. A 3DoF-based immersive video may be implemented by using only a texture image. On the other hand, in order to render an immersive video including depth information such as 3DoF+ or 6DoF, etc., a depth image (or, a depth map) as well as a texture image is also required.

It is assumed that embodiments described below are for immersive video processing including depth information such as 3DoF+ and/or 6DoF, etc. In addition, it is assumed that a view image is configured with a texture image and a depth image.

FIG. 1 is a block diagram of an immersive video processing device according to an embodiment of the present disclosure.

In reference to FIG. 1, an immersive video processing device according to the present disclosure may include a view optimizer 110, an atlas generation unit 120, a metadata generation unit 130, an image encoding unit 140 and a bitstream generation unit 150.

An immersive video processing device receives a plurality of pairs of images, a camera intrinsic parameters and a camera extrinsic parameter as an input data to encode an immersive video. Here, a plurality of pairs of images include a texture image (Attribute component) and a depth image (Geometry component). Each pair may have a different view. Accordingly, a pair of input images may be referred to as a view image. Each of view images may be divided by an index. In this case, an index assigned to each view image may be referred to as a view or a view index.

A camera intrinsic parameters includes a focal distance, a position of a principal point, etc. and a camera extrinsic parameters includes trsanslations, rotations, etc. of a camera. A camera intrinsic parameters and a camera extrinsic parameters may be treated as a camera parameter or a view parameter.

A view optimizer 110 partitions view images into a plurality of groups. As view images are partitioned into a plurality of groups, independent encoding processing per each group may be performed. In an example, view images captured by N spatially consecutive cameras may be classified into one group. Thereby, view images that depth information is relatively coherent may be put in one group and accordingly, rendering quality may be improved.

In addition, by removing dependence of information between groups, a spatial random access service which performs rendering by selectively bringing only information in a region that a user is watching may be made available.

Whether view images will be partitioned into a plurality of groups may be optional.

In addition, a view optimizer 110 may classify view images into a basic image and an additional image. A basic image represents an image which is not pruned as a view image with a highest pruning priority and an additional image represents a view image with a pruning priority lower than a basic image.

A view optimizer 110 may determine at least one of view images as a basic image. A view image which is not selected as a basic image may be classified as an additional image.

A view optimizer 110 may determine a basic image by considering a view position of a view image. In an example, a view image whose view position is the center among a plurality of view images may be selected as a basic image.

Alternatively, a view optimizer 110 may select a basic image based on camera parameters. Specifically, a view optimizer 110 may select a basic image based on at least one of a camera index, a priority between cameras, a position of a camera or whether it is a camera in a region of interest.

In an example, at least one of a view image with a smallest camera index, a view image with a largest camera index, a view image with the same camera index as a predefined value, a view image captured by a camera with a highest priority, a view image captured by a camera with a lowest priority, a view image captured by a camera at a predefined position (e.g., a central position) or a view image captured by a camera in a region of interest may be determined as a basic image.

Alternatively, a view optimizer 110 may determine a basic image based on quality of view images. In an example, a view image with highest quality among view images may be determined as a basic image.

Alternatively, a view optimizer 110 may determine a basic image by considering an overlapping data rate of other view images after inspecting a degree of data redundancy between view images. In an example, a view image with a highest overlapping data rate with other view images or a view image with a lowest overlapping data rate with other view images may be determined as a basic image.

A plurality of view images may be also configured as a basic image.

An Atlas generation unit 120 performs pruning and generates a pruning mask. And, it extracts a patch by using a pruning mask and generates an atlas by combining a basic image and/or an extracted patch. When view images are partitioned into a plurality of groups, the process may be performed independently per each group.

A generated atlas may be composed of a texture atlas and a depth atlas. A texture atlas represents a basic texture image and/or an image that texture patches are combined and a depth atlas represents a basic depth image and/or an image that depth patches are combined.

An atlas generation unit 120 may include a pruning unit 122, an aggregation unit 124 and a patch packing unit 126.

A pruning unit 122 performs pruning for an additional image based on a pruning priority. Specifically, pruning for an additional image may be performed by using a reference image with a higher pruning priority than an additional image.

A reference image includes a basic image. In addition, according to a pruning priority of an additional image, a reference image may further include other additional image.

Whether an additional image may be used as a reference image may be selectively determined. In an example, when an additional image is configured not to be used as a reference image, only a basic image may be configured as a reference image.

On the other hand, when an additional image is configured to be used as a reference image, a basic image and other additional image with a higher pruning priority than an additional image may be configured as a reference image.

Through a pruning process, redundant data between an additional image and a reference image may be removed. Specifically, through a warping process based on a depth image, data overlapped with a reference image may be removed in an additional image. In an example, when a depth value between an additional image and a reference image is compared and that difference is equal to or less than a threshold value, it may be determined that a corresponding pixel is redundant data.

As a result of pruning, a pruning mask including information on whether each pixel in an additional image is valid or invalid may be generated. A pruning mask may be a binary image which represents whether each pixel in an additional image is valid or invalid. In an example, in a pruning mask, a pixel determined as overlapping data with a reference image may have a value of 0 and a pixel determined as non-overlapping data with a reference image may have a value of 1.

While a non-overlapping region may have a non-square shape, a patch is limited to a square shape. Accordingly, a patch may include an invalid region as well as a valid region. Here, a valid region refers to a region composed of non-overlapping pixels between an additional image and a reference image. In other words, a valid region represents a region that includes data which is included in an additional image, but is not included in a reference image. An invalid region refers to a region composed of overlapping pixels between an additional image and a reference image. A pixel/data included by a valid region may be referred to as a valid pixel/valid data and a pixel/data included by an invalid region may be referred to as an invalid pixel/invalid data.

An aggregation unit 124 combines a pruning mask generated in a frame unit in an intra-period unit.

In addition, an aggregation unit 124 may extract a patch from a combined pruning mask image through a clustering process. Specifically, a square region including valid data in a combined pruning mask image may be extracted as a patch. Regardless of a shape of a valid region, a patch is extracted in a square shape, so a patch extracted from a square valid region may include invalid data as well as valid data.

In this case, an aggregation unit 124 may repartition a L-shaped or C-shaped patch which reduces encoding efficiency. Here, a L-shaped patch represents that distribution of a valid region is L-shaped and a C-shaped patch represents that distribution of a valid region is C-shaped.

When distribution of a valid region is L-shaped or C-shaped, a region occupied by an invalid region in a patch is relatively large. Accordingly, a L-shaped or C-shaped patch may be partitioned into a plurality of patches to improve encoding efficiency.

For an unpruned view image, a whole view image may be treated as one patch. Specifically, a whole 2D image which develops an unpruned view image in a predetermined projection format may be treated as one patch. A projection format may include at least one of an Equirectangular Projection Format (ERP), a Cube-map or a Perspective Projection Format.

Here, an unpruned view image refers to a basic image with a highest pruning priority. Alternatively, an additional image that there is no overlapping data with a reference image and a basic image may be defined as an unpruned view image. Alternatively, regardless of whether there is overlapping data with a reference image, an additional image arbitrarily excluded from a pruning target may be also defined as an unpruned view image. In other words, even an additional image that there is data overlapping with a reference image may be defined as an unpruned view image.

A packing unit 126 packs a patch in a rectangle image. In patch packing, deformation such as size transform, rotation, or flip, etc. of a patch may be accompanied. An image that patches are packed may be defined as an atlas.

Specifically, a packing unit 126 may generate a texture atlas by packing a basic texture image and/or texture patches and may generate a depth atlas by packing a basic depth image and/or depth patches.

For a basic image, a whole basic image may be treated as one patch. In other words, a basic image may be packed in an atlas as it is. When a whole image is treated as one patch, a corresponding patch may be referred to as a complete image (complete view) or a complete patch.

The number of atlases generated by an atlas generation unit 120 may be determined based on at least one of an arrangement structure of a camera rig, accuracy of a depth map or the number of view images.

A metadata generation unit 130 generates metadata for image synthesis. Metadata may include at least one of camera-related data, pruning-related data, atlas-related data or patch-related data.

Pruning-related data includes information for determining a pruning priority between view images. In an example, at least one of a flag representing whether a view image is a root node or a flag representing whether a view image is a leaf node may be encoded. A root node represents a view image with a highest pruning priority (i.e., a basic image) and a leaf node represents a view image with a lowest pruning priority.

When a view image is not a root node, a parent node index may be additionally encoded. A parent node index may represent an image index of a view image, a parent node.

Alternatively, when a view image is not a leaf node, a child node index may be additionally encoded. A child node index may represent an image index of a view image, a child node.

Atlas-related data may include at least one of size information of an atlas, number information of an atlas, priority information between atlases or a flag representing whether an atlas includes a complete image. A size of an atlas may include at least one of size information of a texture atlas and size information of a depth atlas. In this case, a flag representing whether a size of a depth atlas is the same as that of a texture atlas may be additionally encoded. When a size of a depth atlas is different from that of a texture atlas, reduction ratio information of a depth atlas (e.g., scaling-related information) may be additionally encoded. Atlas-related information may be included in a "View parameters list" item in a bitstream.

In an example, geometry_scale_enabled_flag, a syntax representing whether it is allowed to reduce a depth atlas, may be encoded/decoded. When a value of a syntax geometry_scale_enabled_flag is 0, it represents that it is not allowed to reduce a depth atlas. In this case, a depth atlas has the same size as a texture atlas.

When a value of a syntax geometry_scale_enabled_flag is 1, it represents that it is allowed to reduce a depth atlas. In this case, information for determining a reduction ratio of a depth atlas may be additionally encoded/decoded. In an example, geometry_scaling_factor_x, a syntax representing a horizontal directional reduction ratio of a depth atlas, and geometry_scaling_factor_y, a syntax representing a vertical directional reduction ratio of a depth atlas, may be additionally encoded/decoded.

An immersive video output device may restore a reduced depth atlas to its original size after decoding information on a reduction ratio of a depth atlas.

Patch-related data includes information for specifying a position and/or a size of a patch in an atlas image, a view image to which a patch belongs and a position and/or a size of a patch in a view image. In an example, at least one of position information representing a position of a patch in an atlas image or size information representing a size of a patch in an atlas image may be encoded. In addition, a source index for identifying a view image from which a patch is derived may be encoded. A source index represents an index of a view image, an original source of a patch. In addition, position information representing a position corresponding to a patch in a view image or position information representing a size corresponding to a patch in a view image may be encoded. Patch-related information may be included in an "Atlas data" item in a bitstream.

An image encoding unit 140 encodes an atlas. When view images are classified into a plurality of groups, an atlas may be generated per group. Accordingly, image encoding may be performed independently per group.

An image encoding unit 140 may include a texture image encoding unit 142 encoding a texture atlas and a depth image encoding unit 144 encoding a depth atlas.

A bitstream generation unit 150 generates a bitstream based on encoded image data and metadata. A generated bitstream may be transmitted to an immersive video output device.

Figure 2:
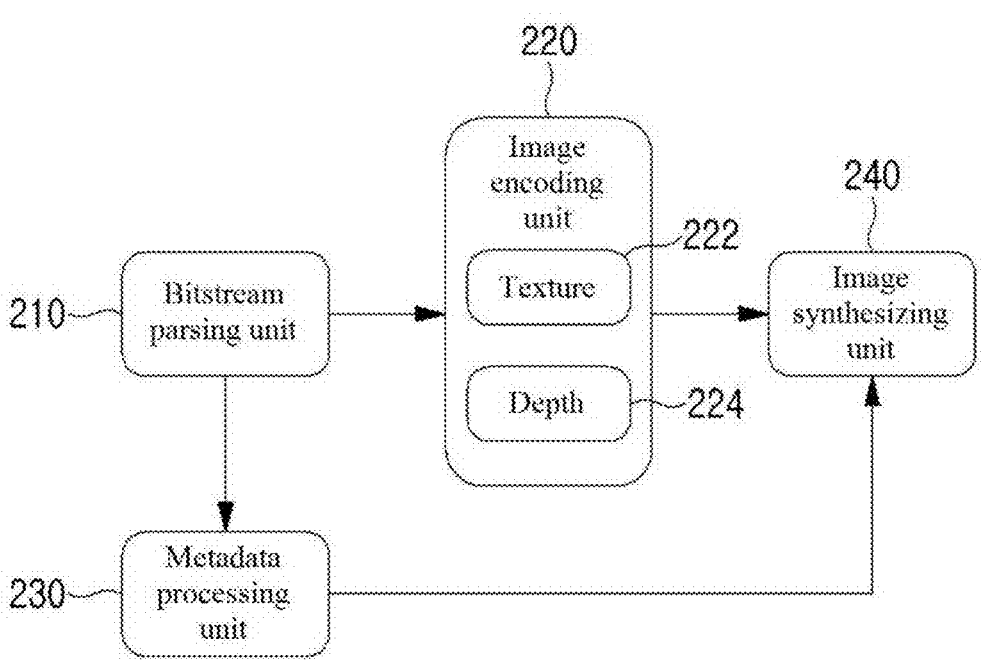
FIG. 2 is a block diagram of an immersive video output device according to an embodiment of the present disclosure.

FIG. 2 is a block diagram of an immersive video output device according to an embodiment of the present disclosure.

In reference to FIG. 2, an immersive video output device according to the present disclosure may include a bitstream parsing unit 210, an image decoding unit 220, a metadata processing unit 230 and an image synthesizing unit 240.

A bitstream parsing unit 210 parses image data and metadata from a bitstream. Image data may include data of an encoded atlas. When a spatial random access service is supported, only a partial bitstream including a watching position of a user may be received.

An image decoding unit 220 decodes parsed image data. An image decoding unit 220 may include a texture image decoding unit 222 for decoding a texture atlas and a depth image decoding unit 224 for decoding a depth atlas.

A metadata processing unit 230 unformats parsed metadata.

Unformatted metadata may be used to synthesize a specific view image. In an example, when motion information of a user is input to an immersive video output device, a metadata processing unit 230 may determine an atlas necessary for image synthesis and patches necessary for image synthesis and/or a position/a size of the patches in an atlas and others to reproduce a viewport image according to a user's motion.

An image synthesizing unit 240 may dynamically synthesize a viewport image according to a user's motion. Specifically, an image synthesizing unit 240 may extract patches required to synthesize a viewport image from an atlas by using information determined in a metadata processing unit 230 according to a user's motion. Specifically, a viewport image may be generated by extracting patches extracted from an atlas including information of a view image required to synthesize a viewport image and the view image in the atlas and synthesizing extracted patches.

Figure 3:
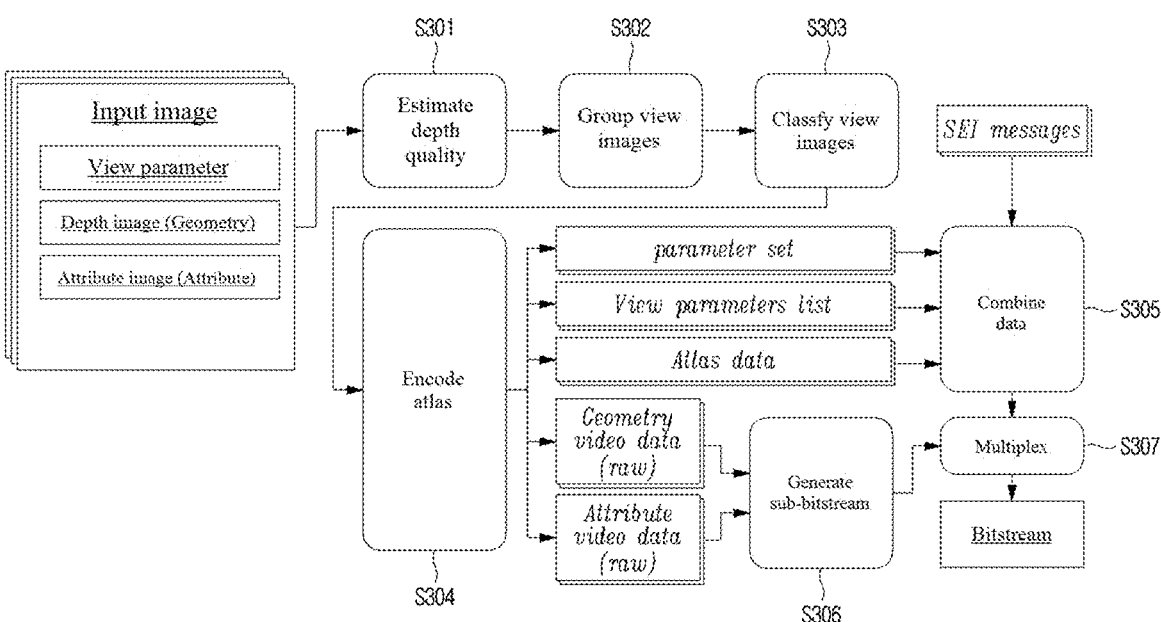
FIG. 3 is a flow chart of an immersive video processing method.
Figure 5:
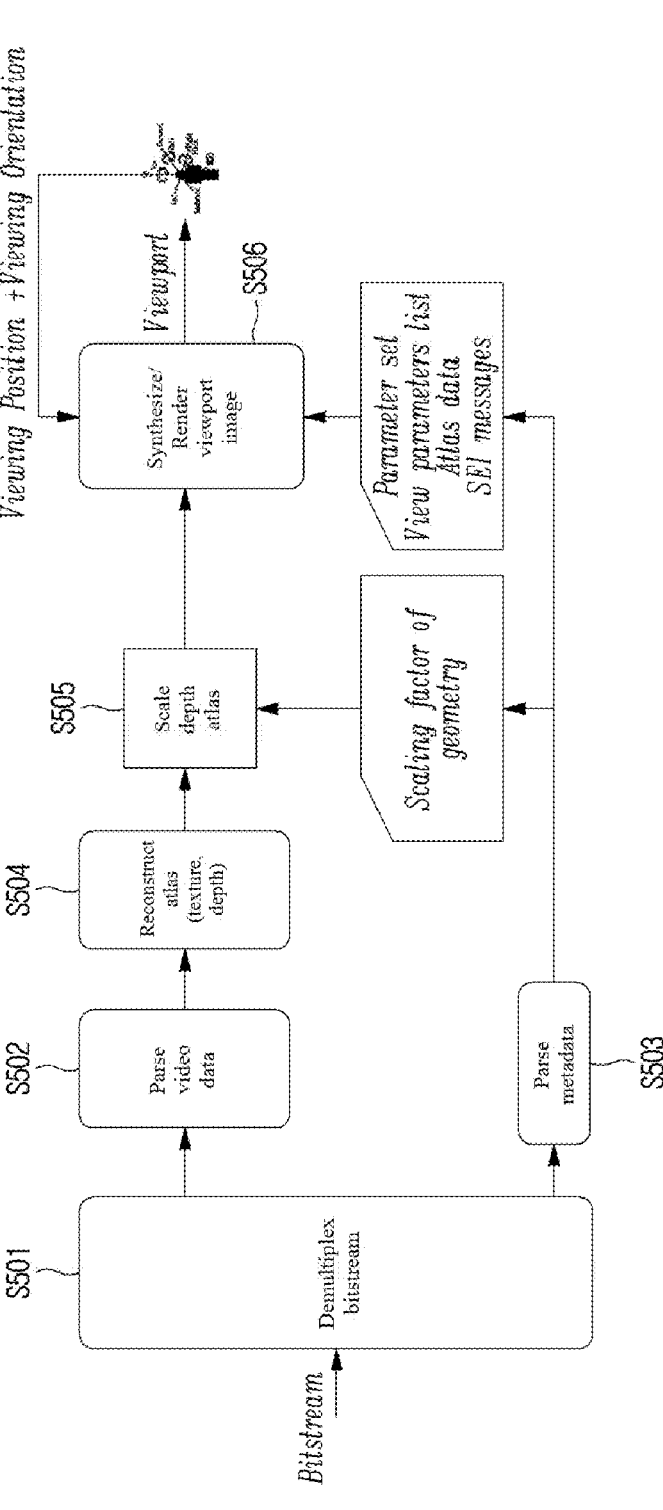
FIG. 5 is a flow chart of an immersive video output method.

FIGS. 3 and 5 show a flow chart of an immersive video processing method and an immersive video output method, respectively.

In the following flow charts, what is italicized or underlined represents input or output data for performing each step. In addition, in the following flow charts, an arrow represents processing order of each step. In this case, steps without an arrow indicate that temporal order between corresponding steps is not determined or that corresponding steps may be processed in parallel. In addition, it is also possible to process or output an immersive video in order different from that shown in the following flow charts.

An immersive video processing device may receive at least one of a plurality of input images, a camera internal variable and a camera external variable and evaluate depth map quality through input data S301. Here, an input image may be configured with a pair of a texture image (Attribute component) and a depth image (Geometry component).

An immersive video processing device may classify input images into a plurality of groups based on positional proximity of a plurality of cameras S302. By classifying input images into a plurality of groups, pruning and encoding may be performed independently between adjacent cameras whose depth value is relatively coherent. In addition, through the process, a spatial random access service that rendering is performed by using only information of a region a user is watching may be enabled.

But, the above-described S301 and S302 are just an optional procedure and this process is not necessarily performed.

When input images are classified into a plurality of groups, procedures which will be described below may be performed independently per group.

An immersive video processing device may determine a pruning priority of view images S303. Specifically, view images may be classified into a basic image and an additional image and a pruning priority between additional images may be configured.

Figure 4:
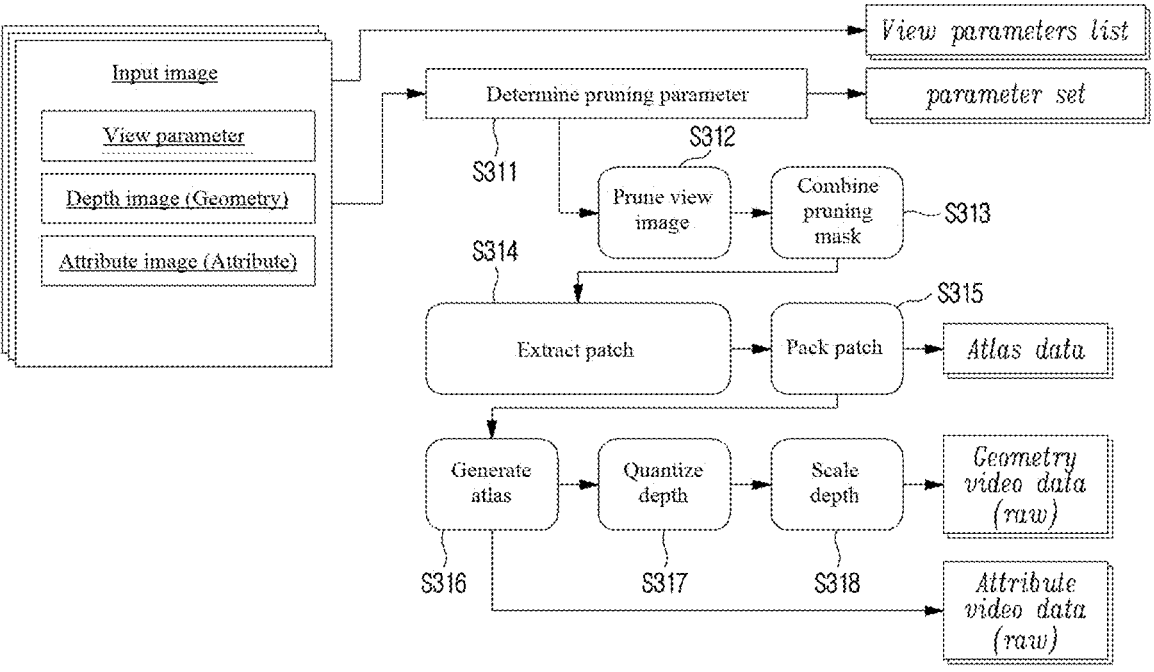
FIG. 4 is a flow chart of an atlas encoding process.

Subsequently, based on a pruning priority, an atlas may be generated and a generated atlas may be encoded S304. A process of encoding atlases is shown in detail in FIG. 4.

Specifically, a pruning parameter (e.g., a pruning priority, etc.) may be determined S311 and based on a determined pruning parameter, pruning may be performed for view images S312. As a result of pruning, a basic image with a highest priority is maintained as it is originally. On the other hand, through pruning for an additional image, overlapping data between an additional image and a reference image is removed. Through a warping process based on a depth image, overlapping data between an additional image and a reference image may be removed.

As a result of pruning, a pruning mask may be generated. If a pruning mask is generated, a pruning mask is combined in a unit of an intra-period S313. And, a patch may be extracted from a texture image and a depth image by using a combined pruning mask S314. Specifically, a combined pruning mask may be masked to texture images and depth images to extract a patch.

In this case, for an non-pruned view image (e.g., a basic image), a whole view image may be treated as one patch.

Subsequently, extracted patches may be packed S315 and an atlas may be generated S316. Specifically, a texture atlas and a depth atlas may be generated.

In addition, an immersive video processing device may determine a threshold value for determining whether a pixel is valid or invalid based on a depth atlas S317. In an example, a pixel that a value in an atlas is smaller than a threshold value may correspond to an invalid pixel and a pixel that a value is equal to or greater than a threshold value may correspond to a valid pixel. A threshold value may be determined in a unit of an image or may be determined in a unit of a patch.

For reducing the amount of data, a size of a depth atlas may be reduced by a specific ratio S318. When a size of a depth atlas is reduced, information on a reduction ratio of a depth atlas (e.g., a scaling factor) may be encoded. In an immersive video output device, a reduced depth atlas may be restored to its original size through a scaling factor and a size of a texture atlas.

Metadata generated in an atlas encoding process (e.g., a parameter set, a view parameter list or atlas data, etc.) and SEI (Supplemental Enhancement Information) are combined S305. In addition, a sub bitstream may be generated by encoding a texture atlas and a depth atlas respectively S306.

And, a single bitstream may be generated by multiplexing encoded metadata and an encoded atlas S307.

An immersive video output device demultiplexes a bitstream received from an immersive video processing device S501. As a result, video data, i.e., atlas data and metadata may be extracted respectively S502 and S503.

An immersive video output device may restore an atlas based on parsed video data S504. In this case, when a depth atlas is reduced at a specific ratio, a depth atlas may be scaled to its original size by acquiring related information from metadata S505.

When a user's motion occurs, based on metadata, an atlas required to synthesize a viewport image according to a user's motion may be determined and patches included in the atlas may be extracted. A viewport image may be generated and rendered S506. In this case, in order to synthesize viewpoint image with the patches, size/position information of each patch and a camera parameter, etc. may be used.

Figure 6:
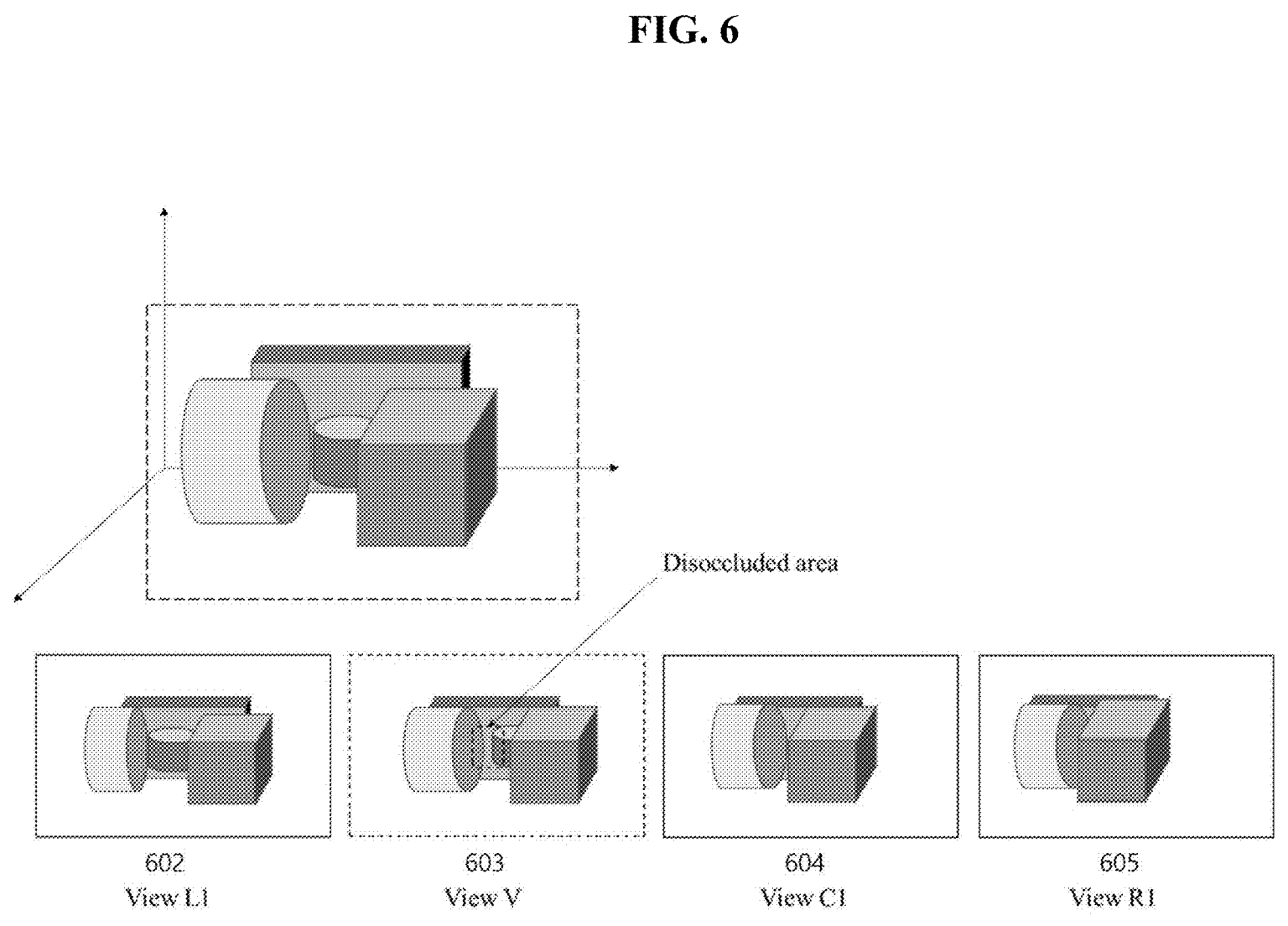

FIG. 6 represents a plurality of images captured by using cameras with a different view.

When ViewC1 604 is referred to as a central view, ViewL1 602 and ViewR1 605 represent a left view image of a central view and a right view image of a central view, respectively.

When a virtual view image ViewV 603 between a central view ViewC1 and a left view image ViewL1 is generated, there may be a region which is hidden in a central view image ViewC1, but is visible in a left view image ViewL1. Accordingly, image synthesis for a virtual view image ViewV may be performed by referring to a left view image ViewL1 as well as a central view image ViewC1.

Figure 7:
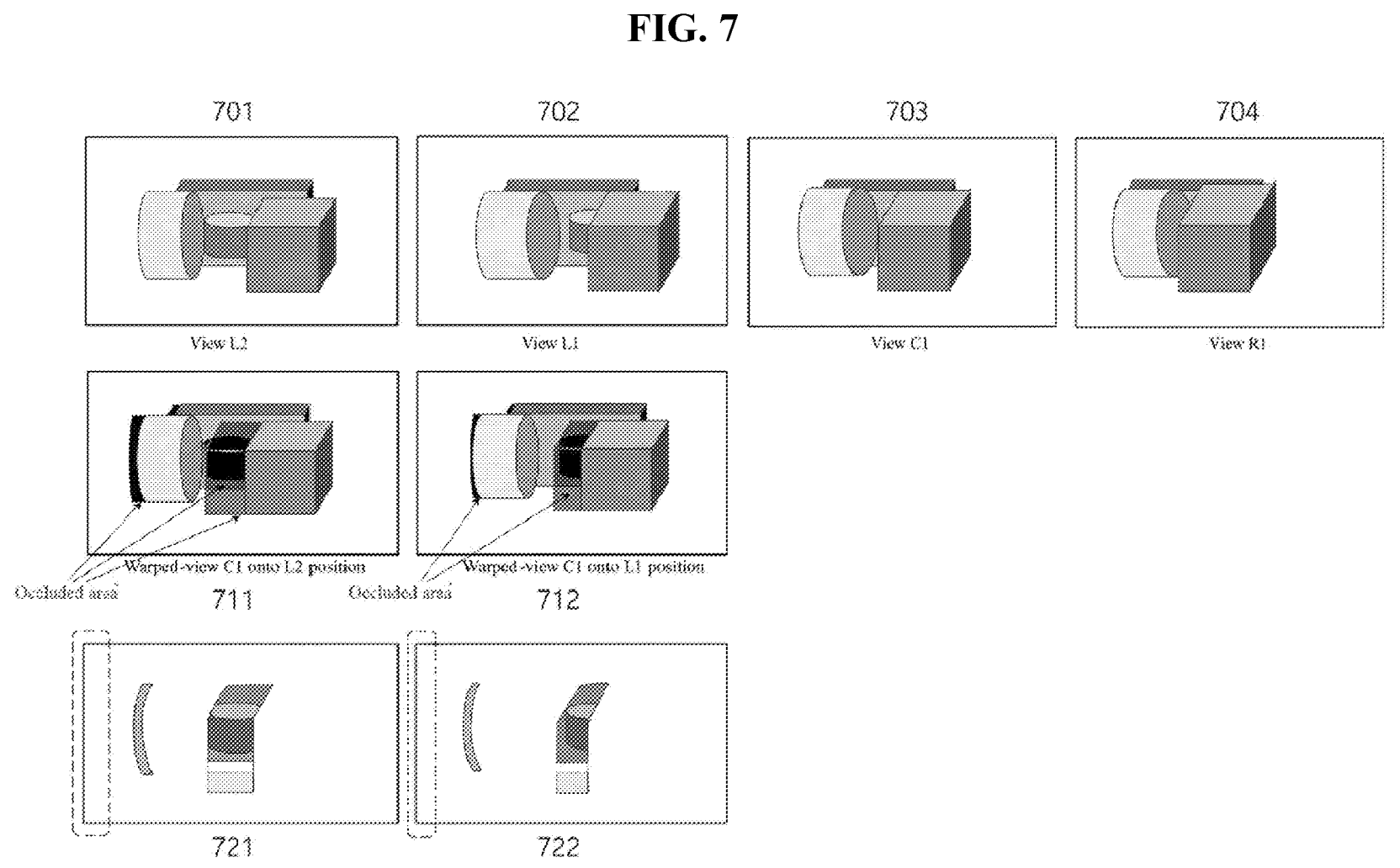

FIG. 7 represents a method of removing redundant data between a plurality of view images.

A basic view among a plurality of view images is selected and for non-basic view images, redundant data with a basic view is removed. In an example, when a central view ViewC1 is referred to as a basic view, remaining views excluding ViewC1 become an additional view used as a reference image in synthesis. All pixels of a basic view image may be mapped to a position of an additional view image by using a three-dimensional geometric relationship and depth information (depth map) of each view image. In this case, mapping may be performed through a 3D view warping process.

In an example, as in an example shown in FIG. 7, a basic view image ViewC1 may be mapped to a position of a first left view image ViewL1 702 to generate a first warped image 712 and a basic view image ViewC1 may be mapped to a position of a second left view image ViewL2 701 to generate a second warped image 711.

In this case, a region which is invisible due to observation parallax in a basic view image ViewC1 is processed as a hole region without data in an warped image. A region where data (i.e., a color) exists except for a hole region may be a region which is also visible in a basic view image ViewC1.

A pruning process for removing an overlapped pixel may be performed through a procedure for confirming whether an overlapped pixel between a basic view and an additional view may be determined as redundancy. In an example, as in an example shown in FIG. 7, a first residual image 722 may be generated through pruning between a first warped image and a first left view image and a second residual image 721 may be generated through pruning between a second warped image and a second left view image. By reducing image data through a pruning process, compression efficiency may be improved in encoding an image.

Meanwhile, a determination on an overlapped pixel may be based on whether at least one of a color value difference and/or a depth value difference for pixels at the same position is smaller than a threshold. In an example, when at least one of a color value difference and a depth value difference is smaller than a threshold, both pixels may be determined to be an overlapped pixel.

In this case, a case may occur in which they are determined to be an overlapped pixel although they are not an overlapped pixel due to a problem such as a color or a depth value noise in an image, an error in a camera calibration value or an error in a decision equation. In addition, a case may also occur in which a color value is different depending on a position of a camera used to capture the pixel due to a characteristic of a reflective surface of various materials in a scene and a source of light even between pixels at the same position. Accordingly, although a pruning process is very accurate, information expressing a scene may be lost, which may cause image quality deterioration when rendering a target view image in a decoder.

Figure 8:
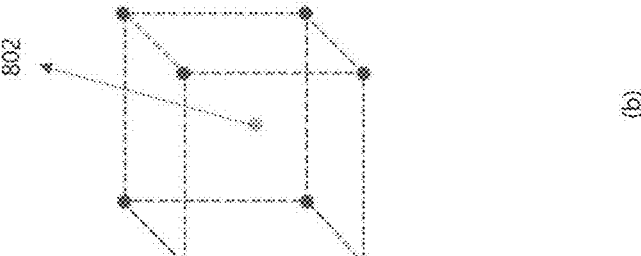
FIG. 8 shows an example in which an object in a three-dimensional space is captured through a plurality of cameras at a different position.
Figure 8:
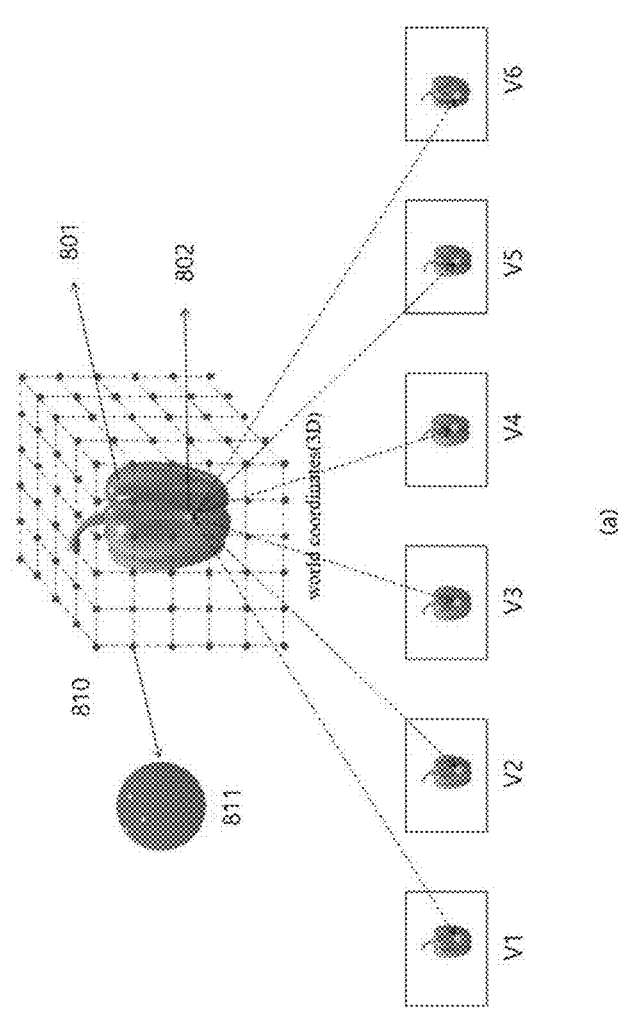

FIG. 8 shows an example in which an object in a three-dimensional space is captured through a plurality of cameras at a different position.

In FIG. 8(*a*), it is assumed that each image is projected into a two-dimensional image.

In FIG. 8(*a*), V1 to V6 represent view images captured by cameras having a different capturing angle (pose). As in a shown example, according to a capturing angle (pose) and a position of a camera acquiring an object, even the same point in a three-dimensional space may have a different aspect of being projected into a two-dimensional image. In an example, when an any one point 802 on an object is projected on each of view images V1 to V6, according to a camera capturing angle (pose), a pixel value corresponding to the any one point 802 in a projected two-dimensional image may be not the same, but different between corrective images. It is because, as in FIG. 9 to be described later, that color value may vary depending on an angle of viewing the same point due to a reflection characteristic of an object surface.

Figure 9:
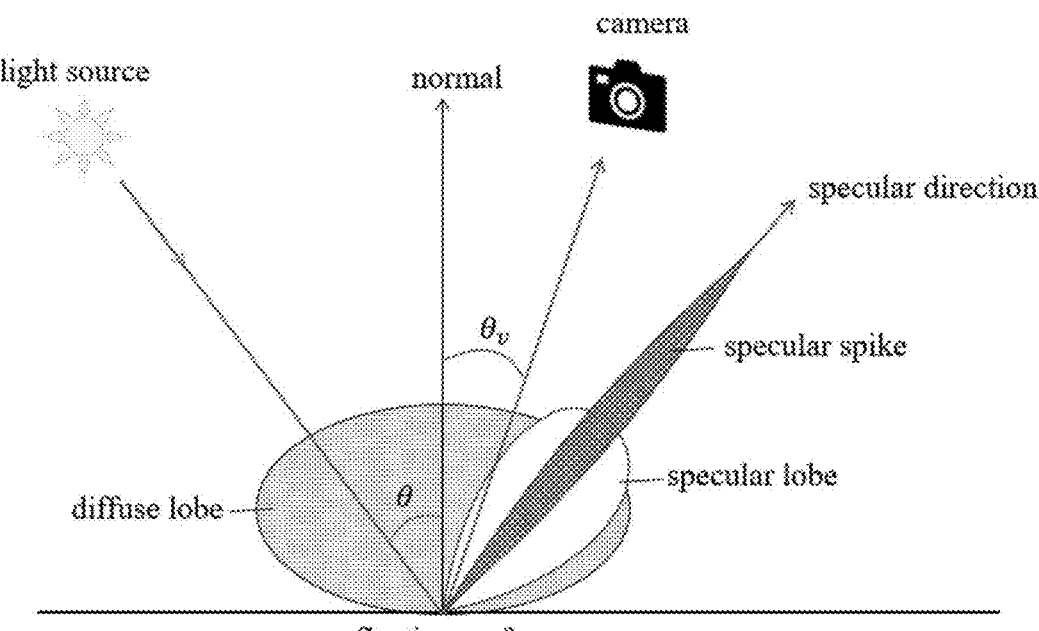
FIG. 9 illustrates a reflection characteristic of an object surface.

FIG. 9 illustrates a reflection characteristic of an object surface.

As in an example shown in FIG. generally according to a reflection characteristic of an object surface, a main component of reflection may be classified into at least one of a diffuse lobe, a specular lobe or a specular spike component.

As a diffuse lobe is a Lambertian surface, it refers to a region having the same brightness regardless of an observer's viewing angle.

A specular lobe is a part which causes reflection multiple times (approximately, 2-3 times) on a surface by a defect on an object surface.

A specular spike component, like perfect specular reflection, is a region where information on a reflective surface acquired by 100% reflection from a specific surface may be lost.

In general, an object surface has a mixed reflective surface characteristic that one or more of listed reflective components are complexly mixed.

Similarly, object 801 shown in FIG. 8(*a*) may also have different brightness per view due to a characteristic of a reflective surface and a light source.

However, when pixels corresponding to any one point 802 on an object in view images are determined to be an overlapped pixel, through a pruning process, a pixel in a basic view image is maintained and a pixel in an additional view image is removed. In other words, although pixels corresponding to any one point 802 on an object in view images have different brightness, if a difference in depth values (or color values) is less than or equal to a threshold value, they are determined as an overlapped pixel.

A pruning process removes data redundancy to improve data compression efficiency, but as in the example, determines pixels with different brightness as an overlapped pixel to cause a loss in information quantity, resulting in image quality deterioration in rendering in a decoder.

In particular, a color value on a surface such as a minor that an incident light source is totally reflected or a transparent object that an incident light source is refracted, not a diffused reflection surface, may be determined as an overlapping pixel and removed in a pruning process although a color value is totally different according to an angle.

In order to reconstruct a color value of a real mixed reflective surface which looks different according to an observer's viewing position and angle, a method of modeling a reflective characteristic of a mixed reflective surface may be considered to have information when viewing at a specific angle for all angles or estimate information when viewing at a specific angle. Hereinafter, a method of modeling a reflective characteristic of a mixed reflective surface is described in detail.

A three-dimensional region of interest to which an object in a target scene belongs may be expressed in a three-dimensional grid structure. In an example, in an example shown in FIG. 8(*a*), it was illustrated that a space including an object 801 is expressed in a three-dimensional grid structure expressed by a world coordinate system. Here, a three-dimensional grid structure refers to a cluster in which three-dimensional points at an even interval are arranged and in an example, a code 811 approximates one of three-dimensional points in a sphere shape. As in an example shown in FIG. 8(*b*), any point 802 represents a three-dimensional point corresponding to any intermediate position in a three-dimensional grid structure.

A three-dimensional grid structure including an object of FIG. 8 may be understood as being configured with an unit cellforming a cubic grid.

Figure 10:
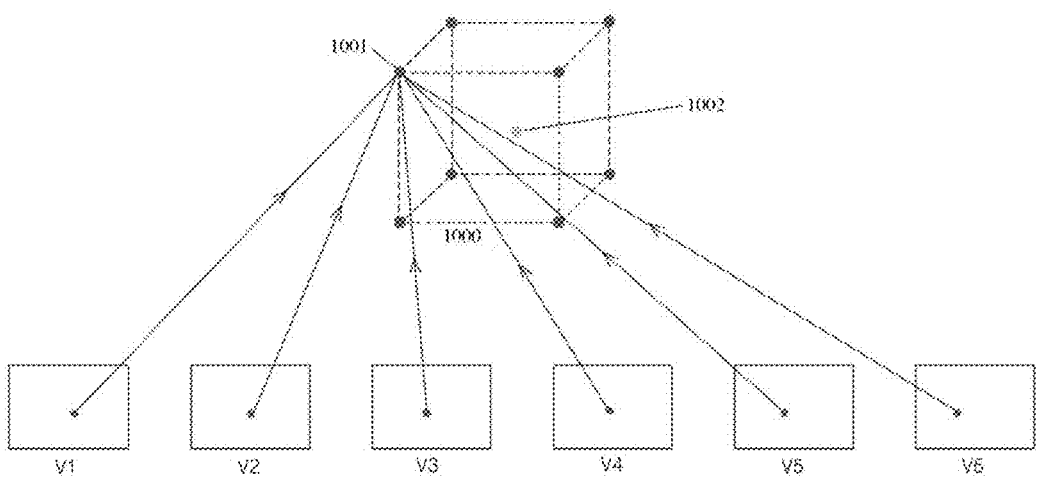
FIG. 10 shows a unit grid.

FIG. 10 shows a unit grid.

In FIG. 10, it was shown that from a pixel of each of view images (V1~V6), for a point 1001 configuring a unit grid, unprojection is performed in a form of a ray. As in a shown example, unprojection may be performed in a form of a ray from a pixel of a view image to a point 1001 configuring a unit grid by using camera calibration information corresponding to a view image. In this case, if a color value of a ray projected on a point 1001 from each view image is referred to, a color value of a point 1001 for any view may be estimated.

Furthermore, if a color value of 8 points configuring a grid 1000 may be estimated by referring to pixels in view images (V1~V6), a value of at least one of a color value, a brightness value or opacity for any point 1002 in a grid may be estimated. In other words, 8 points configuring a grid may be used as reference points or a method such as tri-linear interpolation, an average or weighted operation, etc. of reference points may be used to estimate information on a target point 1002 in a grid.

By applying the method to a three-dimensional grid cluster, for any view, a target object may be reconstructed. On the other hand, as an interval of points configuring a three-dimensional grid cluster surrounding a target object gets closer, a target object may be reconstructed at a higher resolution.

In order to reconstruct a target object by the method, for all reference points configuring a three-dimensional grid cluster for a target object, a color value according to an incidence angle (i.e., a capturing angle) of a ray unprojected from each camera should be known.

Meanwhile, the number of lines passing through a reference point in a form of a ray may be variable depending on at least one of the number of cameras (i.e., view images), an image resolution or a camera geometry.

As the angles of the rays incident from cameras (i.e., view images) to a reference point become more diverse, a color value per bearing or incidence angle of a target point may be accurately reconstructed. In other words, as reflected light information representing information when a light source reflected from a target point is projected on each camera (i.e., each view image) increases (i.e., reflected light information of a light source is acquired at a variety of angles), a target point may be realistically reconstructed at a variety of views and bearings.

As in an example shown in FIG. 8(a), when it is assumed that a reference point has one sphere form 811 with a radius of r, a color value at a moment when a ray is reflected while passing a corresponding reference point may be stored as reflected light information. Meanwhile, the reflected light information may be stored per incidence angle (per bearing) of a ray.

When any view image is synthesized, reflected light information may be utilized to reconstruct a suitable color according to an angle of observing a corresponding reference point.

Meanwhile, the number of rays which are unprojected from a view image and incident on a reference point may be different per reference point.

Figure 11:
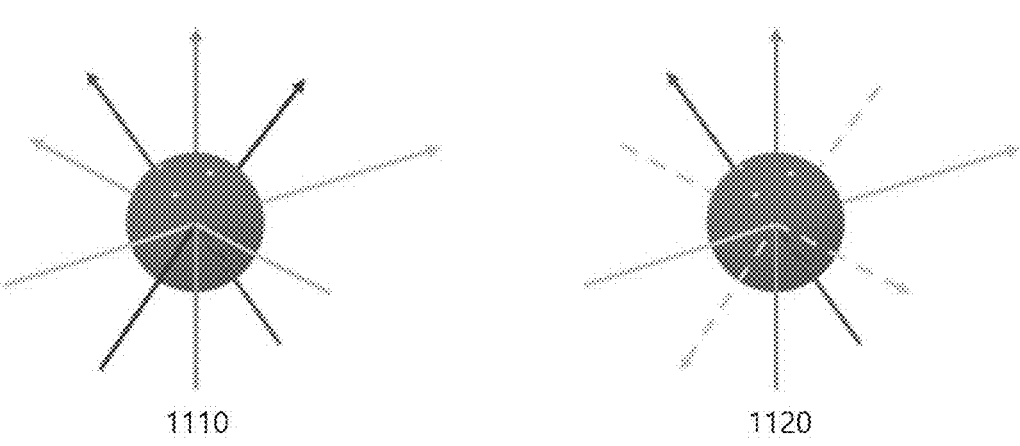
FIG. 11 represents an incidence aspect of rays for reference points.

FIG. 11 represents an incidence aspect of rays for reference points.

In an example shown in FIG. 11, it was illustrated that 5 rays are incident on a first reference point 1110 and 3 rays are incident on a second reference point 1120. Since the number of rays incident on a first reference point 1110 is greater than the number of rays incident on a second reference point 1120, it may be understood that incident light source information for a first reference point 1110 is more diverse than incident light source information for a second reference point 1120. Accordingly, when any view image is synthesized, a first reference point 1110 may be reconstructed with a color with a high sense of reality at more various angles than a second reference point 1120.

However, the maximum number of rays incident on each of a first reference point 1110 and a second reference point 1120 is limited to the number of view images (i.e., cameras) and accordingly, incident light source information may be acquired only for an incidence angle corresponding to each of view images. In other words, since incident light source information is not acquired for all omnidirectional angles, information for arbitrary directions (angle) that a ray is not incident may be estimated through approximation using neighboring values.

In other words, information such as a color of a ray reflected from a reference point may be configured as a neighboring value and a color value in a space or in a bearing that a ray is not incident may be estimated by using at least one neighboring value.

Meanwhile, when a reference point is assumed to have a spherical form, through Laplace's equation in spherical coordinates, distribution of reflected light intensity on a spherical surface may be approximated based on a neighboring value. In an example, distribution of reflected light intensity may be approximated by using a spherical harmonic function.

Equation 1 below represents a spherical harmonic function.

[Equation 1]

$$Y_{l,m}(\theta, \phi) = \begin{cases} c_{l,m} P_l^{|m|}(\cos\theta)\sin(|m|\phi) & -l \le m \le 0 \\ \dfrac{c_{l,m}}{\sqrt{2}} P_l^0(\cos\theta) & m = 0 \\ c_{l,m}, P_l^m(\cos\theta)\cos(m\phi) & 0 \le m \le l \end{cases}$$

Equation 1

In Equation 1, $Y_{l,m}$ on represents a spherical harmonic function. $\theta$ is an angle with a z-axis in a positive direction in a spherical coordinate system and $\phi$ is an angle with a x-axis in a positive direction having a z-axis as an axis. Since the function is consecutive, l is a non-negative integer and m is an integer satisfying $-l \le m \le l$.

In Equation 1, $c_{l,m}$ on may be derived according to the following Equation 2.

$$c_{l,m} = \sqrt{\frac{2l+1}{2\pi}\frac{(l+|m|!)}{(l+|m|!)}}$$

[Equation 2]

In addition, in Equation 1, $$P_l^m$$

represents a Legendre Polynomials.

When a spherical harmonic function approximating spherical distribution of a reflected light component at a target point is referred to as $\hat{f}$, $\hat{f}$ may be represented as a weighted sum of $Y_{l,m}$, basis functions of spherical harmonic of the reference points, as in the following Equation 3.

$$\hat{f}(\theta,\phi) = \Sigma_{l,m} c_{lm} Y_{lm}(\theta,\phi)$$

[Equation 3]

Figure 12:
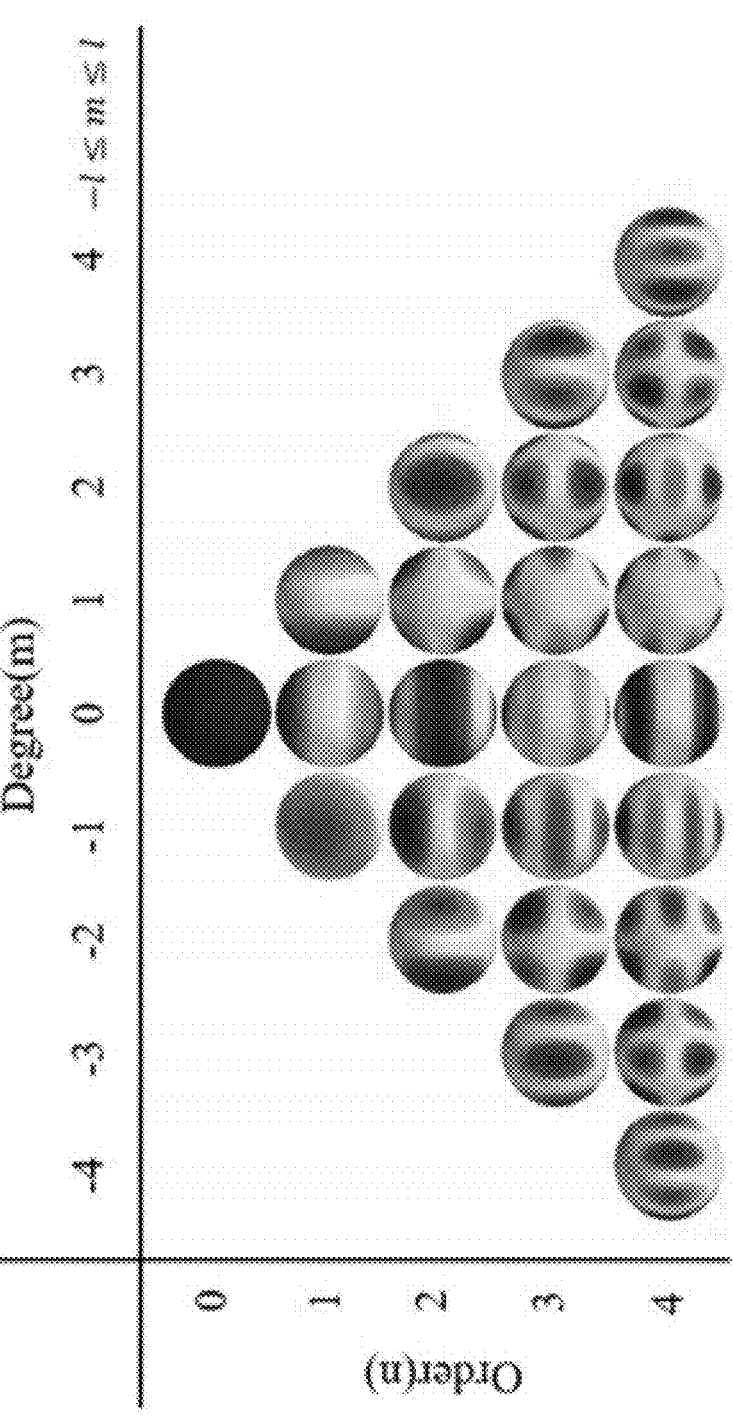
FIG. 12 shows a case in which a distribution map of information expressed by a sphere is different according to a degree and order of a spherical harmonic function.

FIG. 12 shows a case in which a distribution map of information expressed by a sphere is different according to a degree and order of a spherical harmonic function.

In an example shown in FIG. 12, when it is assumed that a degree of a spherical harmonic function is 2, the spherical harmonic function at a target point may be approximated with 9 basis functions, a sum of information which may be expressed in degree of 2 or less (1 basis function when the degree is 0, 3 basis functions when the degree is 1, and 5 basis functions when the degree is 2). When a degree of a spherical harmonic function is 3, a spherical harmonic function at a target point may be approximated with 16 basis functions and when a degree is 4, a spherical harmonic function at a target point may be approximated with 25 basis functions. Here, the number of basis functions may have the same concept as the number of coefficients configuring a spherical harmonic function.

As the degree of a spherical harmonic function increases, it becomes possible to approximate the reflected light component information corresponding to local regions on the spherical coordinate system separately from other regions. In other words, with higher degree of spherical harmonic functions, the high-frequency components of reflected light expressed in the local region on a spherical coordinate system are included.

In reference to intensity of a ray incident on a spherical target point, the intensity per bearing of reflected light component information which may be expressed by a corresponding spherical body may be approximated. Specifically, when a degree of a spherical harmonic function is 2, the spherical harmonic function for a target point may be approximated by calculating a weight function for a total of 9 basis functions.

In this case, when Equation 3 includes information on a coefficient corresponding to a weight of a basis function $Y_{l,m}$, it may be used to approximate the target point and accordingly, reflected light information in any bearing may be reconstructed. In order to approximate the intensity of primary colors, R, G, and B, the weight of a basis function should be calculated by referring to intensity of each channel individually.

By applying the above-described spherical harmonic function to a video encoder/decoder structure, a pixel value for a target point at any view may be reconstructed. Specifically, an encoder may encode a coefficient of basis functions in a form of metadata to transmit it to a decoder and a decoder may use a received coefficient to reconstruct reflected light information in any bearing for a target point. In this case, the minimum size of data for encoding a coefficient may be a value obtained by multiplying the number of points configuring a three-dimensional grid cluster by the number of basis functions (the number of coefficients) of a spherical harmonic function as in the following Equation 4.

$$\text{Minimum Metadata size} = \text{Number of Elements} \times \text{Number of Coefficients} \times \text{Date size per Coefficient} \qquad \text{[Equation 4]}$$

Figure 13:
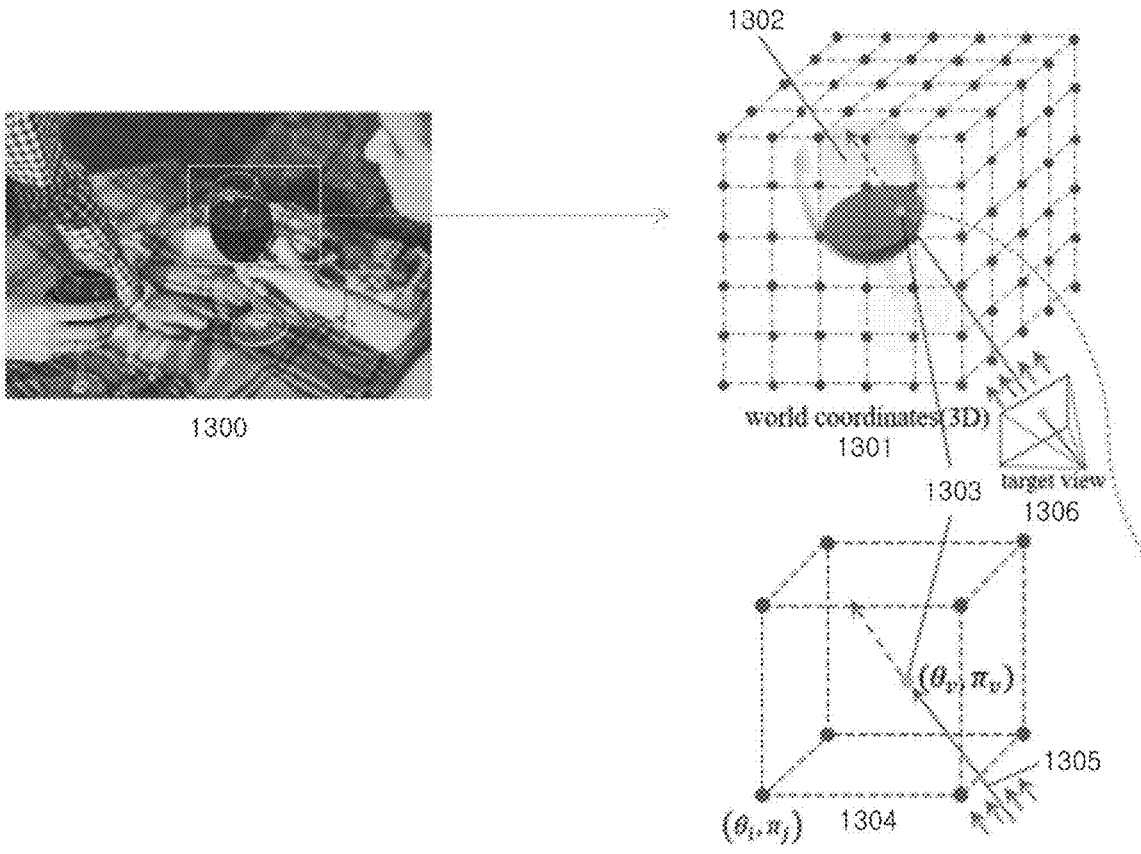
FIG. 13 uses a picture to show a method of rendering a target view image and an example of calculating a spherical harmonic function for a region of interest in a target scene.

FIG. 13 uses a picture to show a method of rendering a target view image and an example of calculating a spherical harmonic function for a region of interest in a target scene.

First, if a spherical harmonic function for each reference point configuring a three-dimensional grid cluster is given, a reflected light component corresponding to a point 1303 reaching a target object 1302 may be estimated on a route of a ray going straight to a target scene through a pixel of a target view image 1300 starting from a camera principal point of a target view 1306 image. In other words, a reflected light component corresponding to a point 1303 where a ray arrives may be estimated by referring to a spherical harmonic function of 8 reference points configuring a grid surrounding a point 1303 where a ray arrives.

A spherical harmonic function of reference points configuring a three-dimensional grid cluster may be pre-calculated by using multiple reference view images in a preprocessing process. Specifically, in a preprocessing process, a spherical harmonic function at an initial $(\theta, \phi)$ value for a reference point may be pre-calculated.

The coefficients of a spherical harmonic function in a unit grid 1304 may be estimated by performing tri-linear interpolation for coefficients for a spherical harmonic function of 8 reference points configuring a unit grid 1304.

In this case, a target spherical harmonic function modeling reflected light at a point where a ray departing from the target view image 1306 is incident on an object in a scene at an angle of $(\theta_v, \phi_v)$ may be derived by linearly combining an initialized basis function with $Y_{l,m}(\theta_i, \phi_j)$, 8 reference spherical harmonic functions configuring a unit grid 1304 after initializing a basis function $Y_{l,m}(\theta_v, \phi_v)$ based on an angle of $(\theta_v, \phi_v)$, an incidence angle of a reflected light source. In other words, reflected light component reflection $\hat{f}(\theta_v, \phi_v)$ at a point where a ray incident at an angle of $(\theta_v, \phi_v)$ reaches may be derived through a linear combination of an initialized basis function $Y_{l,m}(\theta_v, \phi_v)$ and reference spherical harmonic functions $Y_{l,m}(\theta_i, \phi_j)$.

Figure 14:
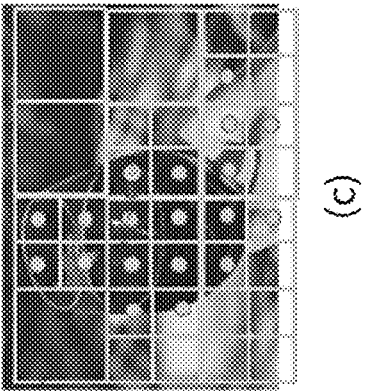
FIG. 14 shows an example of a data structure for transmitting as separate data a spherical harmonic function for each of points configuring a three-dimensional grid cluster.
Figure 14:
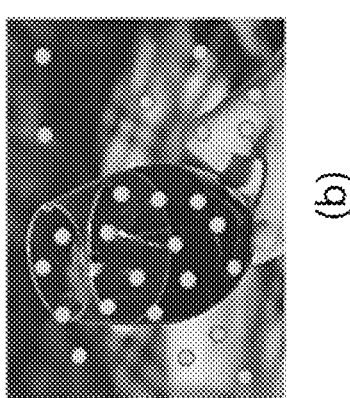
Figure 14:
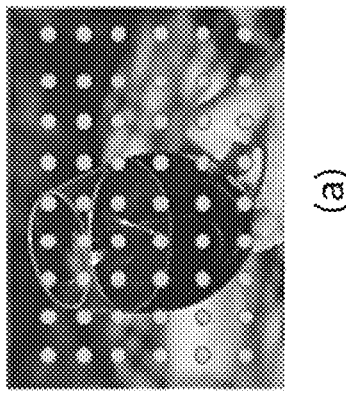

FIG. 14 shows an example of a data structure for transmitting as separate data a spherical harmonic function for each of points configuring a three-dimensional grid cluster.

Data on a spherical harmonic function includes a coefficient of a spherical harmonic function. In addition, in order to configure a spherical harmonic function in a target scene, data on the spherical harmonic function may further include at least one of information on a three-dimensional grid structure or information on a spherical harmonic function.

Here, information on a three-dimensional grid structure may include at least one of a position (Translation) of a target scene in a world coordinate system, a rotation (or pose) of a target scene, or width, height or depth information of a three-dimensional grid sphere cluster.

Information on a spherical harmonic function may include at least one of the number of points (or elements) configuring a three-dimensional grid structure (i.e., the number of spherical harmonic functions), the scale of each point (e.g., a length/a radius r of a spherical coordinate system), the initial reference coordinate $(\theta, \phi)$ of the spherical harmonic function, the number of coefficients (the number of taps) of the spherical harmonic function and/or arrangement information including coefficient values.

Information representing the number of taps of the spherical harmonic function and values of each coefficient may be directly encoded/decoded. Alternatively, after pre-defining a plurality of coefficient sets, an index identifying one of a plurality of coefficient sets may be encoded.

Meanwhile, since the atlas is a two-dimensional image, in order to transmit data on the spherical harmonic function, a three-dimensional grid cluster must be expressed in a form of a two-dimensional image. In an example, as in an example shown in FIG. 14(*a*), reference points (or spherical harmonic functions) may be arranged in a two-dimensional form to correspond to each of pixels configuring a patch in an atlas. In an example shown in FIG. 14(*a*), it was illustrated that reference points are arranged at an even interval according to a patch shape.

Alternatively, as in an example shown in FIG. 14(*b*), a position of reference points on a patch may be determined by reprojecting reference points on a view image. In this case, location information of each reference point (or each spherical harmonic function) in a two-dimensional image may be additionally encoded as metadata.

Alternatively, whether to map a reference point may be determined according to the characteristics of a reflective surface. In an example, as in an example shown in FIG. 14(*c*), only in a region of interest corresponding to a non-Lambertian region in which total reflection or specular spike in a target scene occurs, in a form described in FIG. 14(*a*) or FIG. 14(*b*), reference points may be arranged.

For each patch, at least one information about a spherical harmonic function, for example, coefficient information of a spherical harmonic function, may be encoded as metadata and transmitted. Meanwhile, information (flag) representing whether a point to which a spherical harmonic function is allocated exists in a patch may be encoded. Only when a point to which a spherical harmonic function is allocated exists in a patch, for a patch, information on a spherical harmonic function may be encoded.

Meanwhile, since there are a plurality of input view images, when a spherical harmonic function is encoded for each of a plurality of input views, a problem may occur that the same spherical harmonic function should be repeatedly encoded. In order to solve the problem, information on a spherical harmonic function may be encoded only for a basic view image and information on a spherical harmonic function may not be encoded for an additional view image.

In an example, information on a spherical harmonic function may be encoded and signaled only for a patch for a basic view image in an atlas and information on a spherical harmonic function may not be encoded for a patch for an additional view image. Meanwhile, the entire basic view image may be packed into an atlas as one patch.

In this case, spherical harmonic function information for an additional view image may be configured to be the same as spherical harmonic function information of a basic view image.

As another example, information on a spherical harmonic function may be encoded/decoded in a unit of an entity, not a patch. Information on a spherical harmonic function may be encoded/decoded only for a main entity among a plurality of entities.

Meanwhile, when information on a spherical harmonic function is packed into metadata, reference points in an image are irregularly arranged, so a method of effectively marking arrangement of reference points may be required. As a data structure for efficiently expressing arrangement of reference points, a quadtree structure may be utilized.

Figure 15:
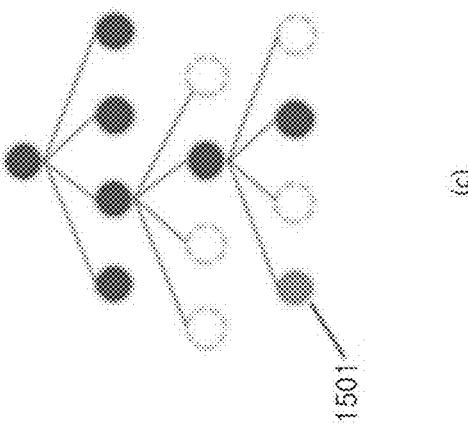
FIG. 15 shows an example in which quad reference points are arranged in a quadtree structure.
Figure 15:
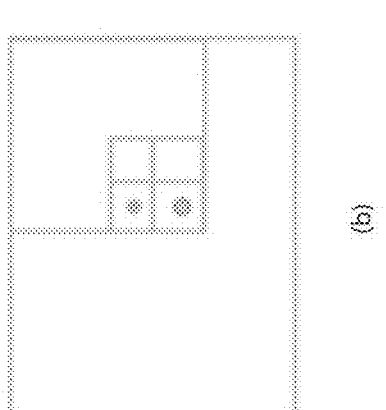
Figure 15:
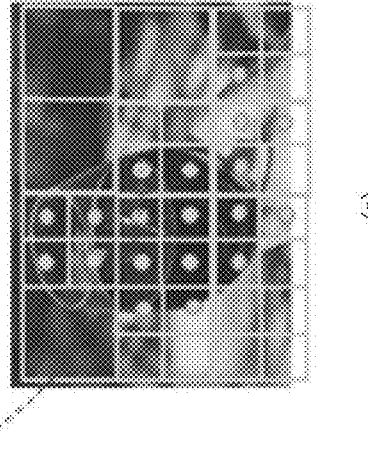

FIG. 15 shows an example in which quad reference points are arranged in a quadtree structure.

A quadtree is for expressing a two-dimensional grid structure in a hierarchical structure. In an example, in an example shown in FIG. 15(a), through spatial partition of a quadtree structure, for a region including a point 1501 to be reconstructed, a partition result as in FIG. 15(b) may be acquired. In this case, spatial partition may be recursive partition of a target two-dimensional region. In an example, a target two-dimensional region may be partitioned into 4 parts to make 4 faces and each partitioned face may be recursively partitioned into 4 parts again.

For each of faces generated by partition, information representing whether a spherical harmonic function is included in a partitioned region may be configured. In an example, if a spherical harmonic function is included in a partitioned region, the information may be configured as 1 and if a spherical harmonic function is not included in a partitioned region, the information may be configured as 0. The information may be encoded as metadata and signaled.

When whether a spherical harmonic function according to a partition depth is included is hierarchically indicated, a result as in FIG. 15(c) may be acquired. In other words, a position of a spherical harmonic function may be expressed in a tree structure by recursively partitioning a region where a spherical harmonic function is included.

Meanwhile, each layer of a tree structure may be identified by a partition depth and nodes in the same layer may be identified by a node index. Information on a spherical harmonic function may be encoded as a data structure corresponding to a node index of each spherical harmonic function.

When expressing a position of each reference point in a three-dimensional space and a coefficient of a spherical harmonic function corresponding thereto, an octree may be applied. Here, an octree represents that a space is recursively partitioned into 8 spaces. As in a quadtree, information on whether a reference point (i.e., a spherical harmonic function) is included in a partitioned space may be encoded.

When representing a foreground and a background of a target scene with spherical harmonic functions, at least one spherical harmonic function position may be designated on an object surface without determining any position in a three-dimensional space in a scene.

Figure 16:
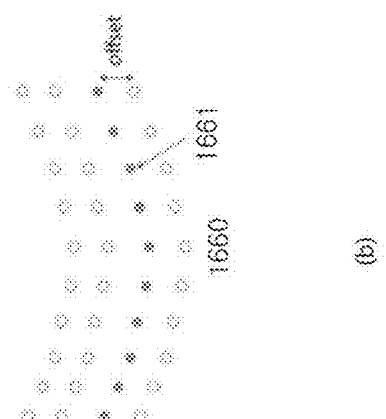
FIG. 16 represents an example in which a position of a plurality of spherical harmonic functions is designated on an object surface.
Figure 16:
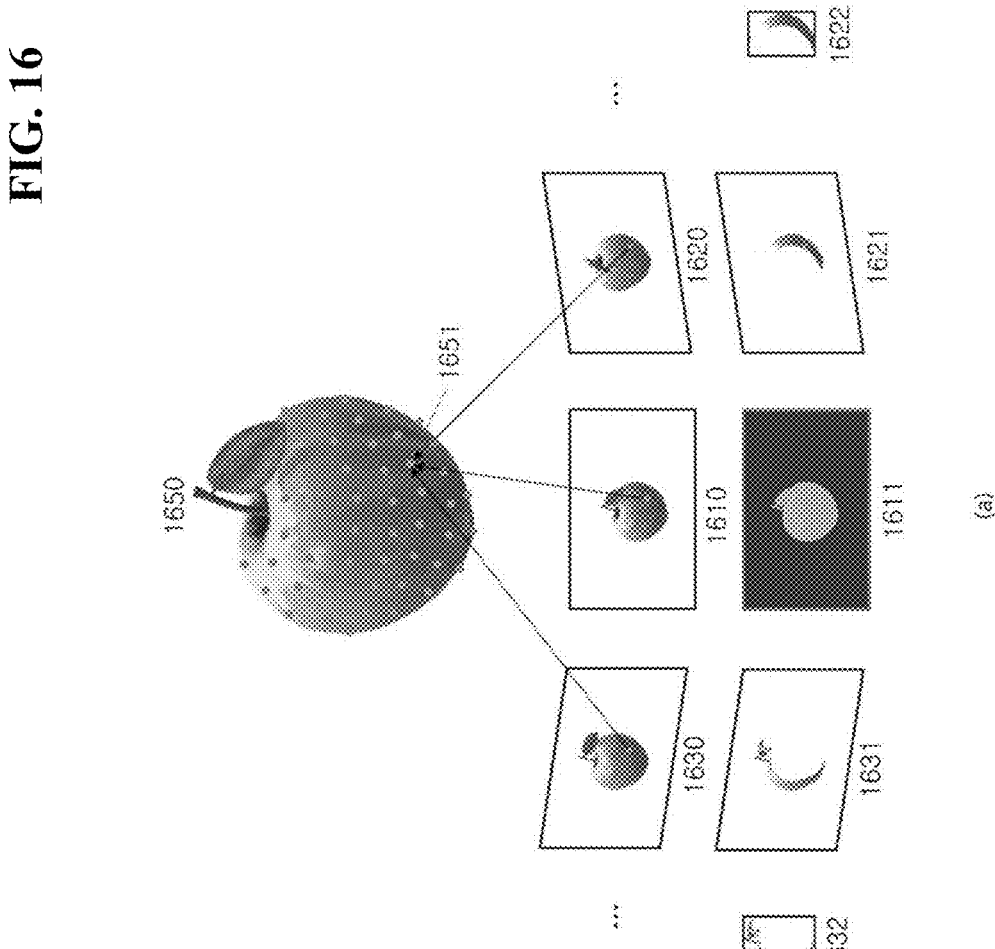

FIG. 16 represents an example in which a position of a plurality of spherical harmonic functions is designated on an object surface.

In an example shown in FIG. 16(a), a reference numeral 1651 represents a surface position of a target object 1650 in a scene to which a spherical harmonic function is allocated.

A coefficient of a spherical harmonic function for the corresponding position 1651 may be calculated by referring to corresponding pixels in a plurality of view images 1610, 1620, 1630 for a target scene.

Meanwhile, on a surface of a target object, a position where a spherical harmonic function is designated may be determined based on a depth map. In an example, as in an example shown in FIG. 16, a spherical harmonic function may be designated on all foreground-background surfaces of a first view image by using a first depth map 1611 corresponding to a first view image 1610.

Alternatively, a spherical harmonic function may be designated only at a subsampled position for a first depth map 1611. By designating a spherical harmonic function only at a subsampled position, data for a spherical harmonic function to be encoded/decoded may be reduced.

Alternatively, a spherical harmonic function may be designated only at a position where a depth value in a first depth map 1611 is within a preconfigured scope.

Meanwhile, when a first view image 1610 and a first depth map 1611 are used, a spherical harmonic function may be designated only for a position visible from a first view. A part which is not visible from a first view, but is visible from a second view image 1620 or a third view image 1630 may determine a position where a spherical harmonic function will be designated through a view warping process using an inter-view geometric relationship and a depth map.

When it is assumed that a first view image is a basic view image and the remaining view images are an additional view image, a first view image has information on all pixels, while a second view image and a third view image which are an additional view image have only view-dependent information which is not visible in a first view image. In other words, an overlapping pixel between a basic view image and an additional view image is removed and the number of spherical harmonic functions to be encoded is reduced, and accordingly, the amount of data to be encoded is reduced.

Meanwhile, parts 1621, 1631 left in a second view image and a third view image are patched 1622, 1632 in a rectangular form, respectively, and packed into at least one image. A patch may be transmitted as scene or image representation data such as a texture (or attribute) component. In this case, depth information corresponding to a corresponding patch may be also packed into a patch and transmitted. Meanwhile, additional packing information including at least one of a view number, a position in a view image or a size of a patch may be included in metadata. When the position information where a spherical harmonic function is designated is included in a patch, information of a spherical harmonic function may be additionally encoded for a corresponding patch.

FIG. 16(b) uses a floor plan to show a position where a spherical harmonic function on a surface of a target object 1650 is designated when looking at a target object 1650 from the top.

Positions (a base layer in FIG. 16(b)) to which a spherical harmonic function is allocated which are determined by using depth information of a basic view image are represented as closed points in the figure. A plurality of closed points may configure one layer.

Meanwhile, considering a case in which a value of a depth map is not accurate, an additional layer, other than a base layer, composed of closed points may be configured. Points included in an additional layer are represented by as open points. In practice, a depth map of a target scene is usually estimated by a computer vision algorithm, and in this case, an error may occur due to an image noise or a calculation error, so it may not be an accurate value. Accordingly, an estimated depth map value is considered as a kind of probability value and is usually calculated by considering a depth map calculation error. If a position where spherical harmonic functions are designated is not accurate, an error may occur because a point at a wrong position is referred to in any view rendering using a spherical harmonic function. Accordingly, a position of spherical harmonic functions derived based on a depth map 1611 of a basic view image may be configured as a base layer and, by configuring an additional layer separated by a predetermined interval from the base layer, the amount of information of spherical harmonic functions around a position estimated as an object surface can be increased, thus, it is possible to obtain a result which is not only robust against an image noise, but also is high-quality and high-resolution in any view rending process. In an example, from a base layer, an additional layer may be configured in a space separated by a predetermined offset for at least one of an x-axis, a y-axis or a z-axis. In an example shown in FIG. 16(*b*), it was illustrated that 3 additional layers other than a base layer are configured.

As above, when a plurality of layers are configured, an offset may be three-dimensional information including a difference for each of a x-axis, a y-axis and a z-axis. An offset, as configuration information of a layer, may be encoded and transmitted through metadata.

Information on a spherical harmonic function for a point included in each layer may be encoded and signaled. As such, when information of a spherical harmonic function is transmitted to a decoder for a plurality of layers, at least one of a color value, an intensity value or opacity at a target point may be calculated by using tri-linear interpolation of a plurality of points. In this case, at least one of a plurality of points may belong to a base layer among a plurality of layers and at least one other point may belong to an additional layer among a plurality of layers.

As a coefficient of a spherical harmonic function is a floating value, the amount of data may be larger than that of image data. Accordingly, when a coefficient of a spherical harmonic function is encoded as a texture component, a compression process based on at least one of voxel pruning or vector quantization may be performed. In other words, data to which voxel pruning or vector quantization is applied may be encoded. A decoder may decode a coefficient of a compressed spherical harmonic function by performing a reverse process of voxel pruning or vector quantization.

An image reconstruction method using a spherical harmonic function as above may be applied by the same principle in a point cloud.

Figure 17:
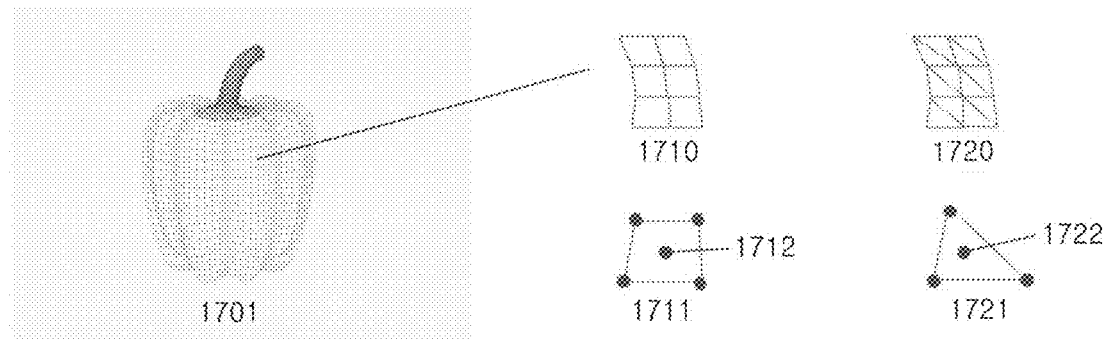
FIG. 17 represents an example in which an object in a target scene is expressed in a form of a mesh.

FIG. 17 represents an example in which an object in a target scene is expressed in a form of a mesh.

Generally, a point cloud may be configured by using camera geometry information to unproject corresponding points on a three-dimensional space from a plurality of view images captured at various views. In this case, each three-dimensional point may be a voxel, a three-dimensional pixel configuring a target object.

A three-dimensional voxel may be a vertex of a triangular or quadrangular mesh for efficient processing of a rendering process and a plurality of vertices may form a mesh.

As in FIG. 17, a mesh may have a quadrangular shape 1710 or a triangular shape 1720.

Meanwhile, as a voxel expresses a corresponding point of an input view image in three dimensions, information on a voxel, e.g., information on texture color, etc. may be encoded.

In order to efficiently perform any view rendering in two dimensions or three dimensions, a target scene or an object in a target scene may be meshed and mesh configuration information may be encoded and transmitted. In this case, mesh configuration information may include at least one of position information of vertices configuring a mesh, group information configuring a mesh or texture color information of each vertex.

In this case, when a mesh is configured, texture color information of a vertex may be determined by blending texture information of a plurality of input view images. Meanwhile, when a corresponding vertex is a non-Lambert region and accordingly, for a corresponding vertex, a reflected light component is different according to a bearing, loss in texture color information occurs in a process of designating a corresponding vertex as one color and as a result, it may result in degrading quality of a reconstructed image.

In order to solve the problem, by configuring a spherical harmonic function for a vertex of a mesh, reflected light information per bearing for a corresponding vertex may be acquired to perform more realistic high-quality rendering.

But, when a spherical harmonic function for all vertices is encoded, a problem may occur that a size of data to be encoded becomes too large. In order to prevent it, a spherical harmonic function may be selectively encoded only for a vertex of a mesh having significant reflected light information. In an example, a spherical harmonic function may be configured and encoded only for a vertex having different reflected light information per bearing. In this case, information (e.g., a flag) representing whether a spherical harmonic function is configured for at least one of vertices configuring a mesh may be encoded for a mesh and signaled. Alternatively, information (e.g., a flag) representing whether a spherical harmonic function is configured for each of vertices configuring a mesh may be encoded and signaled.

As another example, a spherical harmonic function may be configured at a barycentric coordinate (e.g., 1612, 1622) of a mesh vertex. In other words, a size of information about a spherical harmonic function to be encoded may be reduced by changing a configuration unit of a spherical harmonic function to a mesh, not a vertex.

As above, by using a spherical harmonic function, rendering may be performed by applying an effect such as reflection and/or projection, etc. by lighting when an object of heterogeneous media is synthesized into a target scene. Here, heterogeneous media may refer to content produced in a production environment different from a target scene from which a spherical harmonic function is extracted. Here, media may include at least one of computer graphics, a 3D model generated by a volumetric manufacturing technique, a video pointer cloud (V-PCC) or a mesh.

When heterogeneous media is synthesized in a target scene, an object included in heterogeneous media is produced in a lighting environment different from that of the original media, so if there is no lighting information, it will be rendered unnaturally. However, as described above, if information on a spherical harmonic function is used, at least one of reflection, projection or shadow on a heterogeneous object surface may match a target scene to perform natural rendering. In other words, reflected light information on an object included in heterogeneous media may be extracted and data-structured with a spherical harmonic function, and it may be encoded as metadata and signaled.

A name of syntax elements introduced in the above-described embodiments is only temporarily given to describe embodiments according to the present disclosure. Syntax elements may be named with a name different from that proposed in the present disclosure.

A component described in illustrative embodiments of the present disclosure may be implemented by a hardware element. For example, the hardware element may include at least one of a digital signal processor (DSP), a processor, a controller, an application-specific integrated circuit (ASIC), a programmable logic element such as a FPGA, a GPU, other electronic device, or a combination thereof. At least some of functions or processes described in illustrative embodiments of the present disclosure may be implemented by a software and a software may be recorded in a recording medium. A component, a function and a process described in illustrative embodiments may be implemented by a combination of a hardware and a software.

A method according to an embodiment of the present disclosure may be implemented by a program which may be performed by a computer and the computer program may be recorded in a variety of recording media such as a magnetic Storage medium, an optical readout medium, a digital storage medium, etc.

A variety of technologies described in the present disclosure may be implemented by a digital electronic circuit, a computer hardware, a firmware, a software or a combination thereof. The technologies may be implemented by a computer program product, i.e., a computer program tangibly implemented on an information medium or a computer program processed by a computer program (e.g., a machine readable storage device (e.g.: a computer readable medium) or a data processing device) or a data processing device or implemented by a signal propagated to operate a data processing device (e.g., a programmable processor, a computer or a plurality of computers).

Computer program(s) may be written in any form of a programming language including a compiled language or an interpreted language and may be distributed in any form including a stand-alone program or module, a component, a subroutine, or other unit suitable for use in a computing environment. A computer program may be performed by one computer or a plurality of computers which are spread in one site or multiple sites and are interconnected by a communication network.

An example of a processor suitable for executing a computer program includes a general-purpose and special-purpose microprocessor and one or more processors of a digital computer. Generally, a processor receives an instruction and data in a read-only memory or a random access memory or both of them. A component of a computer may include at least one processor for executing an instruction and at least one memory device for storing an instruction and data. In addition, a computer may include one or more mass storage devices for storing data, e.g., a magnetic disk, a magnet-optical disk or an optical disk, or may be connected to the mass storage device to receive and/or transmit data. An example of an information medium suitable for implementing a computer program instruction and data includes a semiconductor memory device (e.g., a magnetic medium such as a hard disk, a floppy disk and a magnetic tape), an optical medium such as a compact disk read-only memory (CD-ROM), a digital video disk (DVD), etc., a magnet-optical medium such as a floptical disk, and a ROM (Read Only Memory), a RAM (Random Access Memory), a flash memory, an EPROM (Erasable Programmable ROM), an EEPROM (Electrically Erasable Programmable ROM) and other known computer readable medium. A processor and a memory may be complemented or integrated by a special-purpose logic circuit.

A processor may execute an operating system (OS) and one or more software applications executed in an OS. A processor device may also respond to software execution to access, store, manipulate, process and generate data. For simplicity, a processor device is described in the singular, but those skilled in the art may understand that a processor device may include a plurality of processing elements and/or various types of processing elements. For example, a processor device may include a plurality of processors or a processor and a controller. In addition, it may configure a different processing structure like parallel processors. In addition, a computer readable medium means all media which may be accessed by a computer and may include both a computer storage medium and a transmission medium.

The present disclosure includes detailed description of various detailed implementation examples, but it should be understood that those details do not limit a scope of claims or an invention proposed in the present disclosure and they describe features of a specific illustrative embodiment.

Features which are individually described in illustrative embodiments of the present disclosure may be implemented by a single illustrative embodiment. Conversely, a variety of features described regarding a single illustrative embodiment in the present disclosure may be implemented by a combination or a proper sub-combination of a plurality of illustrative embodiments. Further, in the present disclosure, the features may be operated by a specific combination and may be described as the combination is initially claimed, but in some cases, one or more features may be excluded from a claimed combination or a claimed combination may be changed in a form of a sub-combination or a modified sub-combination.

Likewise, although an operation is described in specific order in a drawing, it should not be understood that it is necessary to execute operations in specific turn or order or it is necessary to perform all operations in order to achieve a desired result. In a specific case, multitasking and parallel processing may be useful. In addition, it should not be understood that a variety of device components should be separated in illustrative embodiments of all embodiments and the above-described program component and device may be packaged into a single software product or multiple software products.

Illustrative embodiments disclosed herein are just illustrative and do not limit a scope of the present disclosure. Those skilled in the art may recognize that illustrative embodiments may be variously modified without departing from a claim and a spirit and a scope of its equivalent.

Accordingly, the present disclosure includes all other replacements, modifications and changes belonging to the following claim.

The invention claimed is:
1. An image encoding method comprising:
classifying a plurality of view images into a basic view and an additional view;
performing pruning for at least one of the plurality of view images based on a result of the classification;

generating an atlas based on the result of performing the pruning; and encoding the atlas and metadata for the atlas, wherein the metadata includes spherical harmonic function information on a point in a three-dimensional space.

2. The method according to claim 1, wherein:

the spherical harmonic function information includes a coefficient of the spherical harmonic function, and the coefficient is determined based on a color value unprojected on the point from at least one of the plurality of view images.

3. The method according to claim 1, wherein:

information on the spherical harmonic function is encoded as data on a patch in the atlas.

4. The method according to claim 3, wherein:

for the patch, a flag representing whether the point that the spherical harmonic function is allocated to the patch exists is encoded, and for a case in which the point that the spherical harmonic function is allocated to the patch exists, information on the spherical harmonic function is encoded.

5. The method according to claim 1, wherein:

information on the spherical harmonic function is encoded only for the basic image among the plurality of view images.

6. The method according to claim 1, wherein:

for each of regions partitioned by a quadtree structure, information representing whether the point to which the spherical harmonic function is allocated exists is encoded, and for a case in which the point to which the spherical harmonic function is allocated exists in the partitioned region, information on the spherical harmonic function for the point in the partitioned region is encoded.

7. The method according to claim 1, wherein:

for each of points forming a grid structure in the three-dimensional space, the spherical harmonic function is encoded.

8. The method according to claim 1, wherein:

only for the point positioned on a non-Lambertian surface among points forming a grid structure in the three-dimensional space, information on the spherical harmonic function is encoded.

9. The method according to claim 1, wherein:

a plurality of closed points are configured on an object surface searched based on a depth map for the basic image and information on the spherical harmonic function is encoded for each of the plurality of closed points.

10. The method according to claim 9, wherein:

a second layer separated by an offset from a first layer configured with the closed points is configured, and information on the spherical harmonic function is additionally encoded for each of open points included in the second layer.

11. The method according to claim 9, wherein:

view dependence information of the additional view not overlapped with the basic image is extracted as a patch, and information of the spherical harmonic function is encoded for the point included in the patch.

12. The method according to claim 1, wherein:

information of the spherical harmonic function includes at least one of a scale of the point, an initial reference coordinate of the spherical harmonic function, a number of coefficients of the spherical harmonic function or a value of each of coefficients.

13. An image decoding method comprising:

decoding an atlas and metadata for the atlas; and generating a viewport image by using the atlas and the metadata, wherein the metadata includes spherical harmonic function information on a reference point in a three-dimensional space.

14. The method according to claim 13, wherein:

a pixel value for a first point in the viewport image is derived based on the spherical harmonic function for a plurality of reference points adjacent to the first point.

15. The method according to claim 14, wherein:

the plurality of reference points configure a unit grid that the first point is included.

16. The method according to claim 13, wherein:

information on the spherical harmonic function is included in data on a patch in the atlas.

17. The method according to claim 16, wherein:

a flag representing whether a point that the spherical harmonic function is allocated to the patch exists is decoded, and when the flag indicates that the point that the spherical harmonic function is allocated to the patch exists, information on the spherical harmonic function is decoded.

18. The method according to claim 13, wherein:

the metadata includes information on the spherical harmonic function for reference points belonging to a first layer and reference points belonging to a second layer, respectively.

19. The method according to claim 18, wherein:

the metadata includes offset information representing a position difference between the first layer and the second layer.

20. A non-transitory computer-readable medium storing instructions that, when executed by one or more processors, cause the one or more processors to perform operations comprising:

classifying a plurality of view images into a basic image and an additional image;

performing pruning for at least one of the plurality of view images based on a result of the classification;

generating an atlas based on the result of performing the pruning; and encoding the atlas and metadata for the atlas, wherein metadata includes spherical harmonic function information on a point in a three-dimensional space.

* * * * *